United States Patent
Chayat et al.

(10) Patent No.: US 11,474,200 B2
(45) Date of Patent: Oct. 18, 2022

(54) SYSTEMS AND METHODS FOR PROVIDING WIDE BEAM RADAR ARRAYS

(71) Applicant: VAYYAR IMAGING LTD., Yehud (IL)

(72) Inventors: Naftali Chayat, Kfar Saba (IL); Yuval Lomnitz, Herzeliya (IL); Mark Popov, Ramat Gan (IL); Damian Hoffman, Ramat Gan (IL); Alexei Khazan, Rosh Haayin (IL); Rohi Halimi, Shokeda (IL); Harel Golombek, Netanya (IL); Tom Harel, Shefayim (IL); Orel Ron, Rishon Letsiyon (IL)

( * ) Notice: Subject to any disclaimer, the term of this patent is extended or adjusted under 35 U.S.C. 154(b) by 0 days.

(21) Appl. No.: 17/615,847

(22) PCT Filed: Nov. 9, 2020

(86) PCT No.: PCT/IB2020/060510
§ 371 (c)(1),
(2) Date: Dec. 2, 2021

(87) PCT Pub. No.: WO2021/090286
PCT Pub. Date: May 14, 2021

(65) Prior Publication Data
US 2022/0206141 A1    Jun. 30, 2022

Related U.S. Application Data

(60) Provisional application No. 63/021,373, filed on May 7, 2020, provisional application No. 63/014,211, filed
(Continued)

(51) Int. Cl.
*G01S 7/03* (2006.01)
*G01S 13/933* (2020.01)
(Continued)

(52) U.S. Cl.
CPC .......... *G01S 7/032* (2013.01); *G01S 13/0209* (2013.01); *G01S 13/34* (2013.01); *G01S 13/93* (2013.01);
(Continued)

(58) Field of Classification Search
CPC ................. G01S 13/93; G01S 13/0209; G01S 2013/0245; G01S 7/032; G01S 13/34;
(Continued)

(56) References Cited

U.S. PATENT DOCUMENTS 6,657,577 B1 * 12/2003 Gregersen ................ G01V 3/12
343/793
9,647,345 B2 * 5/2017 Hyde ........................ H01Q 1/28
(Continued)

OTHER PUBLICATIONS

Shahramian et al, "A 16-element W-band phased-array transceiver chipset with flip-chip PCB integrated antennas for multi-gigabit wireless data links" IEEE, Jul. 2018, retrieved [Mar. 14, 2021]. https://ieeexplore.ieee.org/document/8353471.

*Primary Examiner* — Vladimir Magloire
*Assistant Examiner* — Alexander L. Syrkin
(74) *Attorney, Agent, or Firm* — Alphapatent Associates, Ltd; Daniel J. Swirsky

(57) ABSTRACT

Systems and methods for providing wide field-of-view radar arrays. Quadrature phase-shift keying (QPSK) beam forming reduces side lobes by applying a phase shift to transmitted signals to selected transmitting antennas. Super-hemispherical radar coverage at high gain in both broadside and end-fire directions is provided by beam directing elements mounted to a printed circuit board.

3 Claims, 20 Drawing Sheets

Related U.S. Application Data on Apr. 23, 2020, provisional application No. 62/993,732, filed on Mar. 24, 2020, provisional application No. 62/955,487, filed on Dec. 31, 2019, provisional application No. 62/932,511, filed on Nov. 8, 2019.

(51) Int. Cl.
*G01S 13/34* (2006.01)
*G01S 13/931* (2020.01)
*G01S 13/02* (2006.01)
*G01S 13/93* (2020.01)
*H01Q 1/32* (2006.01)

(52) U.S. Cl.
CPC .......... *G01S 13/931* (2013.01); *G01S 13/933* (2020.01); *H01Q 1/3233* (2013.01); *G01S 2013/0245* (2013.01)

(58) Field of Classification Search
CPC .... G01S 13/931; G01S 13/933; G01S 13/422; G01S 13/426; G01S 2013/9316; G01S 7/027; G01S 7/03; H01Q 1/3233
USPC .............................. 342/61, 175, 642, 70, 179
See application file for complete search history.

(56) References Cited

U.S. PATENT DOCUMENTS

| | | | |
|---|---|---|---|
| 9,923,271 B2* | 3/2018 | Hyde | ..................... H01Q 13/28 |
| 2004/0140925 A1* | 7/2004 | Kim | ..................... G01S 13/0209 342/28 |
| 2010/0006663 A1 | 3/2010 | Puzella | |
| 2011/0015694 A1 | 1/2011 | Alexander et al. | |
| 2015/0023403 A1 | 1/2015 | Li | |
| 2018/0021927 A1 | 1/2018 | Lin | |
| 2019/0027176 A1 | 1/2019 | Kurokawa et al. | |
| 2019/0271762 A1* | 9/2019 | Sakai | ..................... G01S 13/93 |
| 2022/0120847 A1* | 4/2022 | Zhang | ................... G01S 13/426 |
| 2022/0128678 A1* | 4/2022 | Abdul Kareem | ... G01S 13/0209 |

* cited by examiner

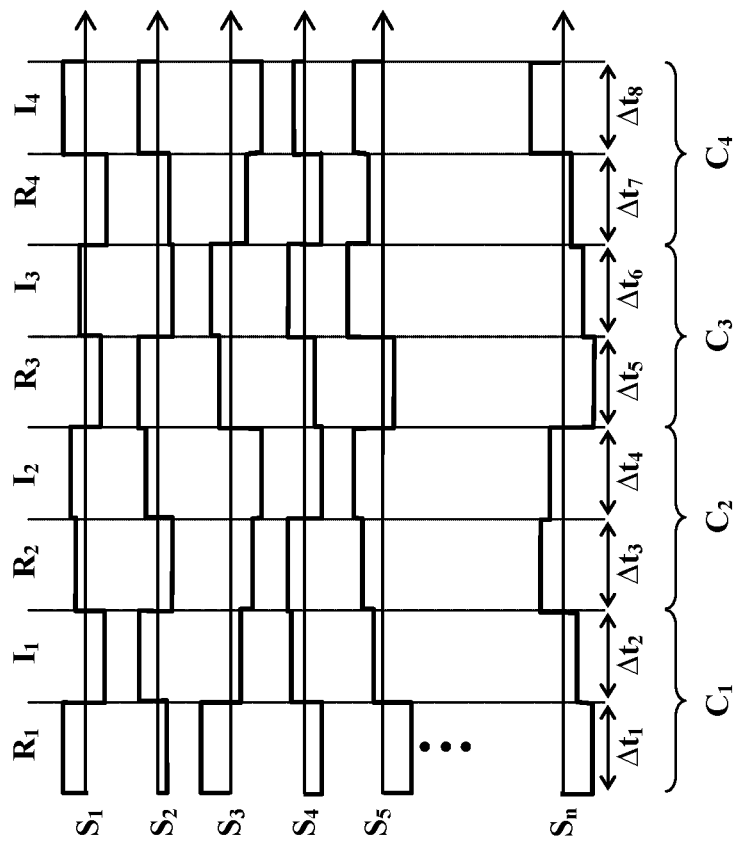
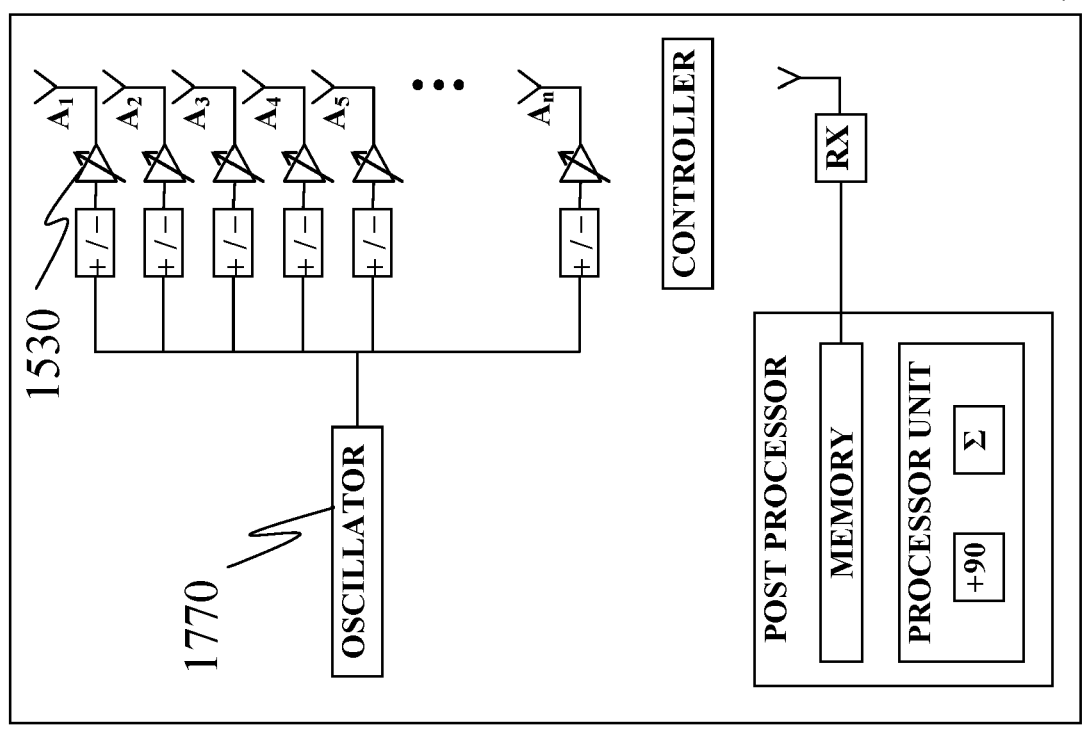
Fig. 3B
Fig. 3A

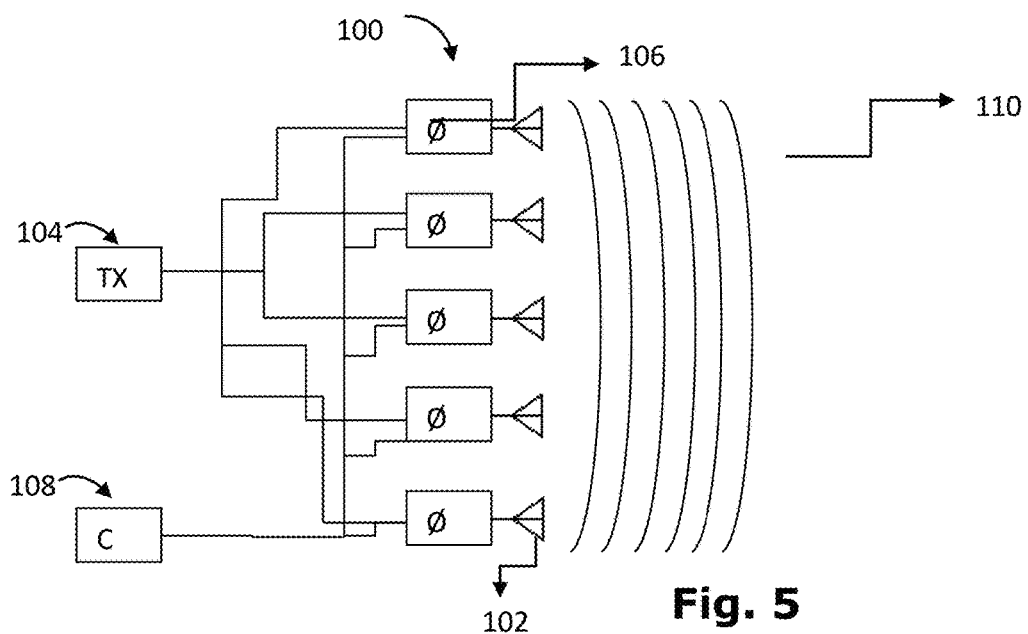
Fig. 5
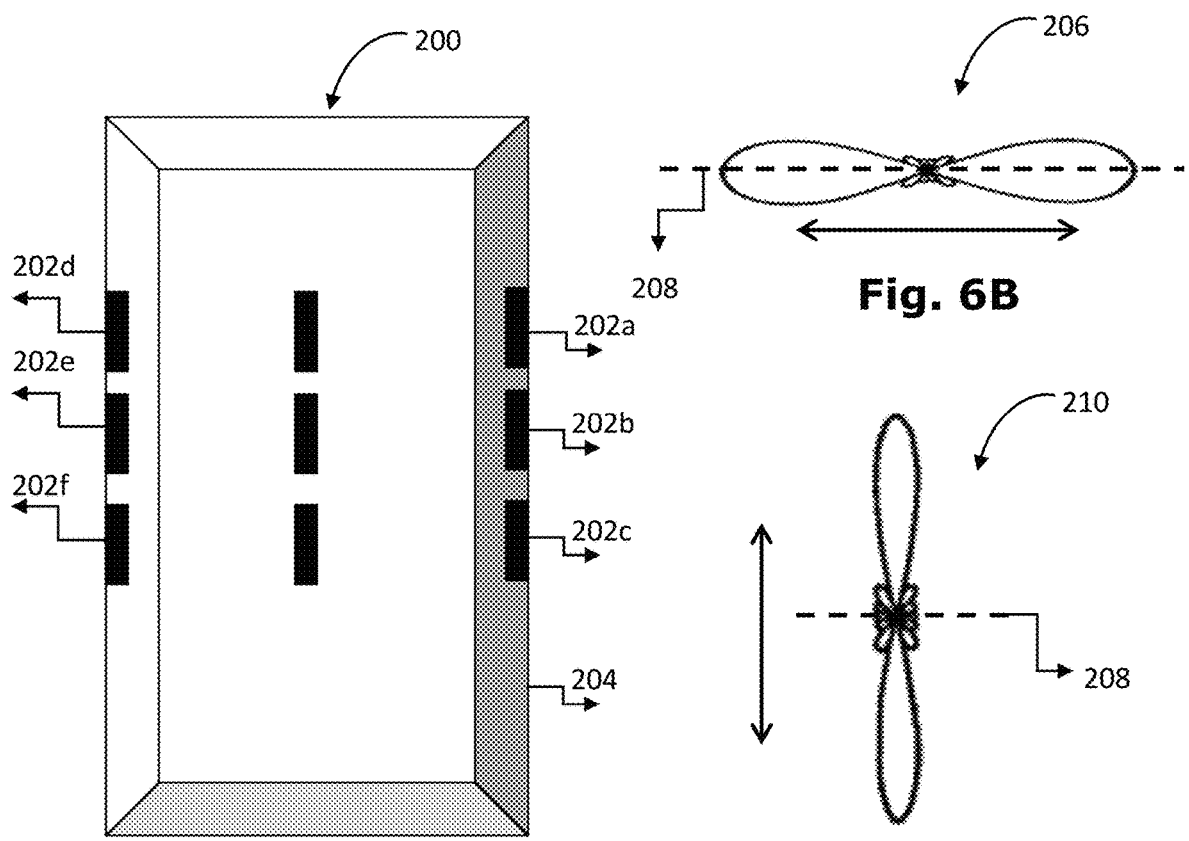
Fig. 6A
Fig. 6B
Fig. 6C

SYSTEMS AND METHODS FOR PROVIDING WIDE BEAM RADAR ARRAYS

CROSS-REFERENCE TO RELATED APPLICATIONS

This application is a U.S. National Phase application under 35 U.S.C. 371 of International Application No. PCT/IB2020/060510, which has an international filing date of Nov. 9, 2020, and which claims the benefit of priority from U.S. Provisional Patent Application No. 62/932,511, filed Nov. 8, 2019, U.S. Provisional Patent Application No. 62/955,487, filed Dec. 31, 2019, U.S. Provisional Patent Application No. 62/993,732, filed Mar. 24, 2020, U.S. Provisional Patent Application No. 63/014,211, filed Apr. 23, 2020, and U.S. Provisional Patent Application No. 63/021,373, filed May 7, 2020, the contents of which are incorporated by reference in their entirety.

FIELD OF THE DISCLOSURE

The disclosure herein relates to systems and methods for providing radar arrays having wide fields of view. In particular systems and methods are described for reducing side lobes as well as increasing gain and phase linearity over super-hemispherical radar coverage.

BACKGROUND

The application of radar is becoming more and more popular with the development of the signal technology progress. Radar is an electronic system with the advantages of low cost, low-power consumption, and high precision. It can be significantly applied in various applications including, space shuttle topographic missions, optics, geotechnical mapping, meteorological detection, and so on. The working efficiency of a radar system is based upon reliable and stable radar signal with wide coverage, high directionality, high gain and low signal-to-noise ratio.

The directionality achievable by antenna depends on its physical size, relative to the wavelength at the frequency of operation. This is true for both mechanically steered and electronically steered beams. Electronic beam steering involves aligning the phases of signals from/to antenna elements in a given direction. The beam shape of an antenna array depends upon the phase shift applied to each antenna element in the array. Typically each antenna element has an a-priori implementation dependent phase shift related to the transmission lines and amplifiers along the signal path to the antenna element. Where no additional phase shift is applied, the resulting beam typically has no well-defined beam shape, such that the direction from which reflected beams are received is difficult to determine.

A well-known method of achieving highly directional beams is applying phase shift along each path to the corresponding antenna elements, so that the transmissions from different elements combine coherently in a given propagation direction. However, applying arbitrary phase shift incurs implementation complexity, and sometimes there's a need to resort to coarse phase control. Examples of coarse phase control are selecting one of 2 or 4 possible phases, while finer control may allow selecting on of 8 or 16 phase values in each phase-controlled path. Nevertheless, the BPSK beam forming generates, on the average, significant side lobes which may dissipate about 60% of the energy of the transmission. Reduction of sidelobes calls for finer-grain control of the phase, e.g. every 90 degrees rather than 180 degrees. With 90 degree granularity of phase control, only 20% of energy is lost to sidelobes.

By way of example, in the context of imaging, the transmit antennas may be scanned by various code-sequences over several time intervals (for example, switching between antennas over time, or coding the antennas by a Hadamard code, or beamforming toward specific directions). Reflection from a moving target may produce phase rotation over those time intervals in a manner detrimental to imaging. The motivation to generate good beamformers arrives from the fact that concentrating energy to a different direction in each time interval reduces the effect of phase rotation. Furthermore, where transmission sweep over a range of frequencies is transmitted over a time period, such as an up-chirp or a down-chirp, the delay between time intervals is increased still further.

As a result it can be very difficult to accurately determine the location of a target.

The need remains, therefore, for effective beam forming and reducing side lobes in antenna arrays. The invention described herein addresses the above-described needs.

SUMMARY OF THE EMBODIMENTS

According to one aspect of the presently disclosed subject matter, a system is introduced for providing wide field-of-view radars. The system may include an antenna array comprising an array of transmitting antennas mounted to a printed circuit board and an array of receiving antennas mounted to the printed circuit board, and a wave deflection mechanism mounted in proximity to the printed circuit board.

The wave deflection mechanism may be configured such that waves transmitted away from the board by the array of transmitting antennas are incident upon the wave deflection mechanism and are directed away from the board with a different direction and field of view. Similarly, waves reflected from objects within the target region towards the wave deflection mechanism are directed towards the receiving antennas onto the board.

Optionally, the wave deflection mechanism may comprise a reflector such as a mirror, perhaps selected from a group comprising a conical mirror, a hyperbolic mirror, a paraboloid mirror and the like as well as combinations thereof. Where appropriate, the wave deflection mechanism is field-of view optimized for azimuth elevation mirror-transmitter combinations. Optionally, the wave deflection mechanism comprises a quasioptic.

Additionally or alternatively, the system may further include at least one binary phase shifter. Such as phase shifter may be configured and operable to selectively apply a phase shift of 180 degrees to a transmitted signal. A controller may be configured to send instructions to the at least one binary phase shifter. The system may also include at least one receiving antenna; and a post processor comprising a memory operable to save received signals; and a processing unit operable to apply a 90 degree phase shift to selected received signals stored in the memory, and further operable to sum received signals stored in the memory.

In still another aspect a method is taught for simulating quadrature phase-shift key (QPSK) beam forming in an antenna array, wherein each antenna of the array is connected to a common transmitter via a binary phase shifter. The method may include determining a required complex QPSK steering vector for each transmitting antenna of the array. The steering vector typically has a real component selected from 0 and 180 degrees and an imaginary component selected from 90 and 270 degrees.

Accordingly, the transmitter generates an oscillating signal. During a first time interval, for each transmitting antenna having an associated steering vector with a real component of 180 degrees, said binary phase shifter a 180 degree phase shift to the transmitted signal is applied. During a second time interval, for each transmitting antenna having an associated steering vector with an imaginary component of 180 degrees, said binary phase shifter a 180 degree phase shift to the transmitted signal is applied. A post processor may be used to apply a 90 degree phase shift to signals received during the second time interval, and the post processor may sum the signals received during the first time interval to 90 degree phase shifted signals received during the second time interval. Optionally the transmitter may sweep the oscillating signal over a range of frequencies during each time interval.

Accordingly, according to various examples, a controller may provide a system for simulating quadrature phase-shift key (QPSK) beam forming in an antenna array, the system comprising a transmitter, an antenna. The controller may be operable to: determine a required complex steering vector for each antenna of the array, the complex steering vector comprising a real component selected from 0 and 180 degrees and an imaginary component selected from 90 and 270 degrees; during a first time interval, instruct the binary phase shifters to apply a 180 degree phase shift to the transmitted signal for each antenna having an associated steering vector with a real component of 180 degrees; and during a second time interval, instruct the binary phase shifters to apply a 180 degree phase shift to the transmitted signal for each antenna having an associated steering vector with an imaginary component of 180 degrees; and wherein said post processor is operable to apply a 90 degree phase shift to signals received during the second time interval; and sum the signals received during the first time interval to 90 degree phase shifted signals received during the second time interval.

Optionally, a dedicated binary phase shifter is provided for each transmitting antenna of the array. Additionally or alternatively, an independently controlled switch connects each transmission antenna to the oscillator.

Where appropriate, a gain control unit may be associated with each transmitting antenna, and the controller is further configured to send instructions to the gain control units. Accordingly, for each transmitting antenna, the controller may be operable to select a required amplitude AR for the real component of the associated steering vector; during a first time interval instruct the associated gain control unit to apply a first gain GR to the transmitted signal; select a required amplitude AI for the imaginary component of the associated steering vector; and during a second time interval instruct the associated gain control unit to apply a second gain GI to the transmitted signal wherein the second gain GI is equal to the product of GR and the ratio of AI to AR. Variously, each antenna may have a dedicated binary phase shifter, or a common binary phase shifter may be connected to multiple antennas.

In another aspect of the disclosure, a PCB mounted radar system is introduced comprising: a first array of transmitters mounted to an obverse surface of a printed circuit board; a first array of receivers mounted to an obverse surface of a printed circuit board; a second array of transmitters mounted to a reverse surface of a printed circuit board; a second array of receivers mounted to a reverse surface of a printed circuit board; and a common controller mounted to board.

In still another aspect a method is taught for simulating quadrature phase-shift key (QPSK) beam forming in an antenna array, wherein each antenna of the array is connected to a common transmitter via a binary phase shifter. The method may include determining a required complex QPSK steering vector for each transmitting antenna of the array. The steering vector typically has a real component selected from 0 and 180 degrees and an imaginary component selected from 90 and 270 degrees.

Accordingly, the transmitter generates an oscillating signal. During a first time interval, for each transmitting antenna having an associated steering vector with a real component of 180 degrees, said binary phase shifter a 180 degree phase shift to the transmitted signal is applied. During a second time interval, for each transmitting antenna having an associated steering vector with an imaginary component of 180 degrees, said binary phase shifter a 180 degree phase shift to the transmitted signal is applied. A post processor may be used to apply a 90 degree phase shift to signals received during the second time interval, and the post processor may sum the signals received during the first time interval to 90 degree phase shifted signals received during the second time interval. Optionally the transmitter may sweep the oscillating signal over a range of frequencies during each time interval.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIG. 3A is a block diagram schematically representing selected elements of a second embodiment of a system for simulating quadrature phase-shift keying (QPSK) beam forming in which each antenna is connected to gain control unit;

FIG. 3B are a set of graphs indicating a possible set of profiles showing an example of how the phase of the transmitted signal from each transmitter antenna of the second embodiment may change over time;

FIG. 5 illustrates a schematic view of a prior art depicting a traditional phase array system;

FIG. 6A illustrates a system 200 comprising array of antennas installed in a forward-looking direction on a circuit board;

FIG. 6B illustrates the radiation pattern of forward looking antennas in the boresight direction;

FIG. 6C illustrates the radiation pattern of forward looking antennas in the end-fire direction;

FIG. 10 illustrates a schematic view of a prior art PCB mounted radar system;

DETAILED DESCRIPTION

Figure 1A:
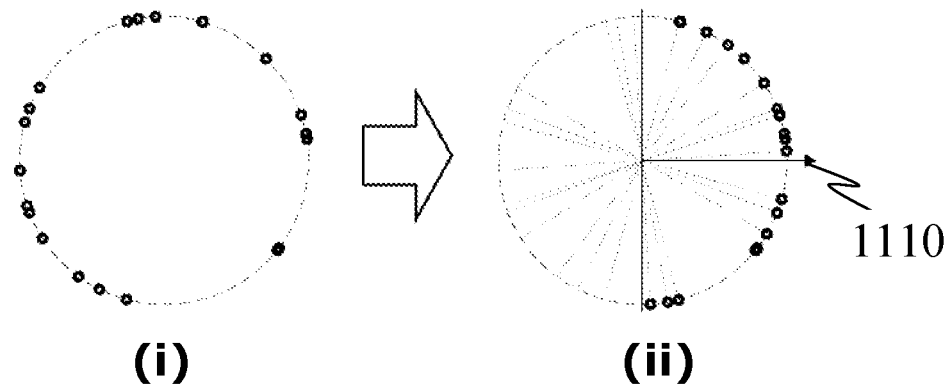
FIG. 1A illustrates how a steering vector may be generated by BPSK phase shifting of the phase of selected antennas by 0 or 180 degrees.

Aspects of the present disclosure relate to systems and methods for providing radar arrays having wide fields of view. In particular systems and methods are described for reducing side lobes as well as increasing gain and phase linearity over super-hemispherical radar coverage.

In order to reduce side lobes, signals transmitted by each antenna of the array may be binary phase shifted according to a required temporal phase shift profile. Post processing methods may be applied to the received reflected signal over multiple time periods to simulate multiple phase shift beam forming such as quadrature phase-shift keying (QPSK) beam forming, for example. Typically, the receivers and transmitters may be synchronized in order to produce consistent results during the time interval on which the signals are combined.

In order to provide super-hemispherical radar coverage, in another aspect of the invention, a MIMO array antenna system is disclosed. The system involves a plurality of first antennas disposed on face of a Printed Circuit Board (PCB), a plurality of second antennas disposed on back side of the PCB, a plurality of third antennas disposed on upper part of the PCB, a plurality of fourth antennas disposed on lower part of the PCB, and a plurality of fifth antennas on both the side corners of the PCB. The first and fifth antennas provide high gain and phase linearity in the boresight direction, while second, third and fourth antennas provide high gain and phase linearity in the end-fire direction, thereby providing super-hemispherical radar coverage.

Additionally or alternatively, a reflector may be mounted in proximity to the PCB. The reflector may be oriented such that the array of transmitting antennas transmit waves perpendicularly to the surface of the board which is incident upon the reflector surface and are directed radially away from the board, while the waves received from objects within the target region radially towards the reflector are directed towards the receiving antennas in a direction perpendicular to the PCB board.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally, or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Alternative methods and materials similar or equivalent to those described herein may be used in the practice or testing of embodiments of the disclosure. Nevertheless, particular methods and materials described herein for illustrative purposes only. The materials, methods, and examples not intended to be necessarily limiting. Accordingly, various embodiments may omit, substitute, or add various procedures or components as appropriate. For instance, the methods may be performed in an order different from described, and that various steps may be added, omitted or combined. In addition, aspects and components described with respect to certain embodiments may be combined in various other embodiments.

Figure 1B:
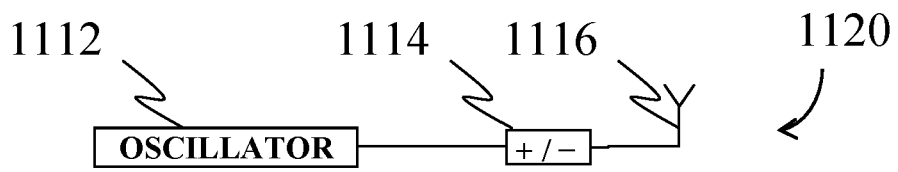
FIG. 1B illustrates a possible BPSK mechanism for phase shifting the signal to an antenna by 180 degrees.

Reference is now made to FIG. 1A and FIG. 1B. FIG. 1A shows how a steering vector may be generated by BPSK phase shifting. With no artificial phase shifting, an array of antennas may produce a range of phase shifts due to the nature of the electronic circuits and the like, plus the phases generated by wave propagation to a desired steering direction (termed "array factor"). This range of phases is represented in the circular range of FIG. 1A(i). The phasors shown in the figure do not add up coherently. By selectively adding a 180 degree phase shift to all the antennas producing phases within the left side of the circle, it is possible to partially align these phasors as shown in FIG. 1A(ii), and thus emit energy toward the desired steering direction. Accordingly, each antenna 1116 of the array may be connected to the signal generating oscillator 1112 via a binary phase shifter 1114, as shown in FIG. 1B. Although the BPSK mechanism may indeed generate a steering vector 1110, the resultant beam suffers significant side lobes and large losses.

Figure 1C:
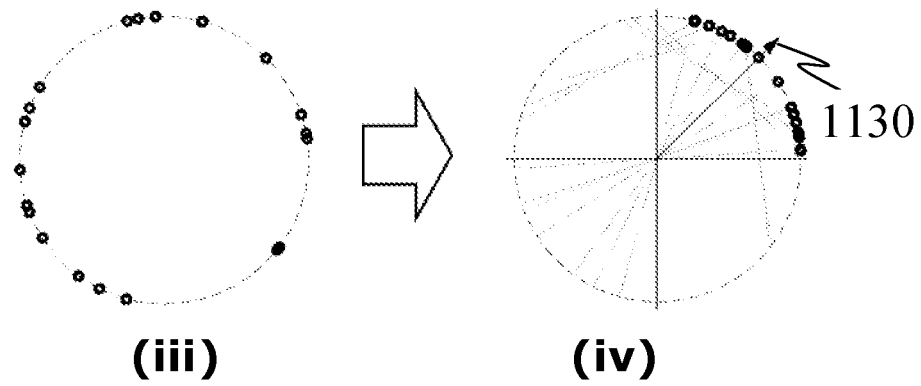
FIG. 1D illustrates a possible quadrature modulation mechanism for phase shifting the signal to an antenna by 0, 90, 180 or 270 degrees.
Figure 1D:
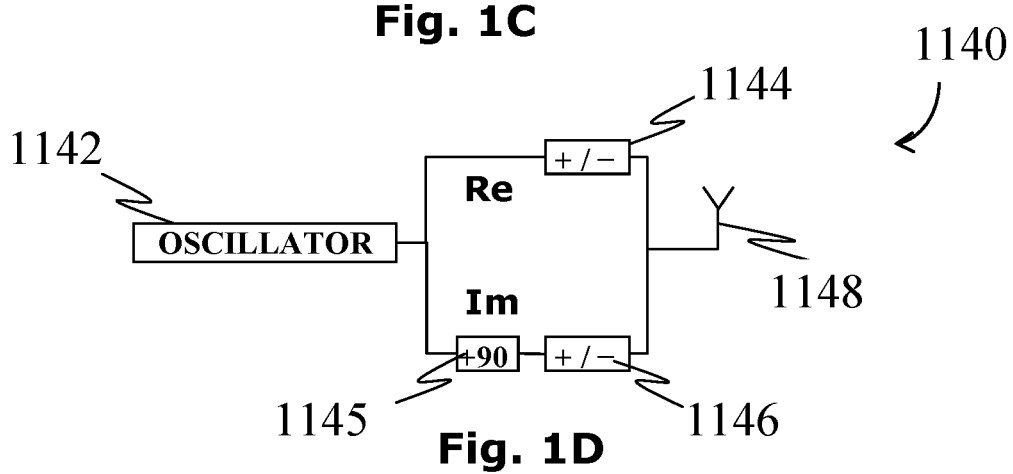

A more efficient steering vector may be generated by providing further phase shift options. Referring to FIGS. 1C and 1D, a range of phases such as shown in FIG. 1C(iii) may be converted into a net steering vector 1130 such as shown in FIG. 1C(iv) by selectively shifting each transmitted signal by 0, 90, 180 or 270 degrees as required (QPSK).

FIG. 1D illustrates a possible hardware arrangement 1140 for producing such phase shifts in an antenna 1148 of the array. Each antenna 1148 of the array may be connected to the signal generating oscillator 1142 via a phase shifting mechanism having two parallel arms an in-phase arm (Re), and a quadrature arm (Im).

The in-phase arm (Re) includes a first binary phase shifter 1144 which may be selectively activated to add a 180 degree phase shift to the oscillating signal as required. Alternatively, by not activating the first binary phase shifter the signal is transferred to the transmitting antenna in phase.

The quadrature arm (Im) includes a second binary phase shifter 1146 and a quarter cycle phase shifter 1145. The quarter cycle phase shifter 1145 is configured to add a 90 degree phase shift to the oscillating signal. Accordingly, if the second binary phase shifter 1146 is not activated a 90 degree phase shift is applied to the signal transferred to the antenna. Alternatively, if the second binary phase shifter is activated to add a further 180 degree phase shift, a total phase shift of 270 degree is applied to the signal transferred to the antenna as required.

It will be appreciated that such a hardware quadrature modulation mechanism such as shown in FIG. 1D may significantly improve the overall steering vector. However, the arrangement requires significantly more hardware elements than the simple binary phase shifter 1120 of FIG. 1B. The addition of a quadrature arm for each antenna, including a quarter cycle phase shifter which may need to be located physically close to the antenna itself, places significant hardware constraints on the architects of antenna array circuits.

A possible solution for generating improved steering vectors using only the binary phase shifter elements is described here.

Figure 2B:
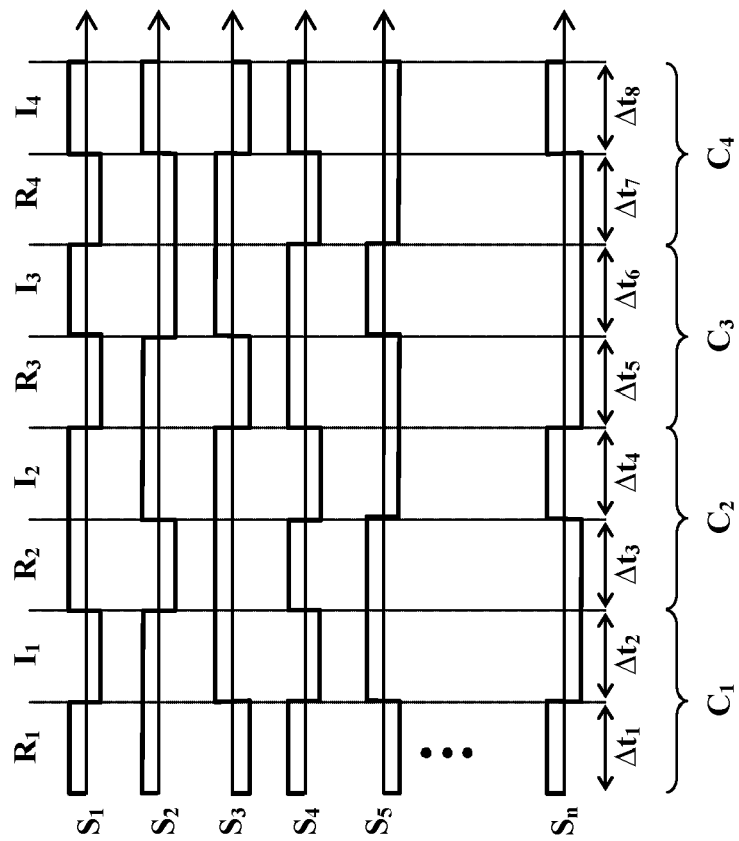
FIG. 2B are a set of graphs indicating a possible set of profiles showing an example of how the phase of the transmitted signal from each transmitter antenna of the first embodiment may change over time.
Figure 2A:
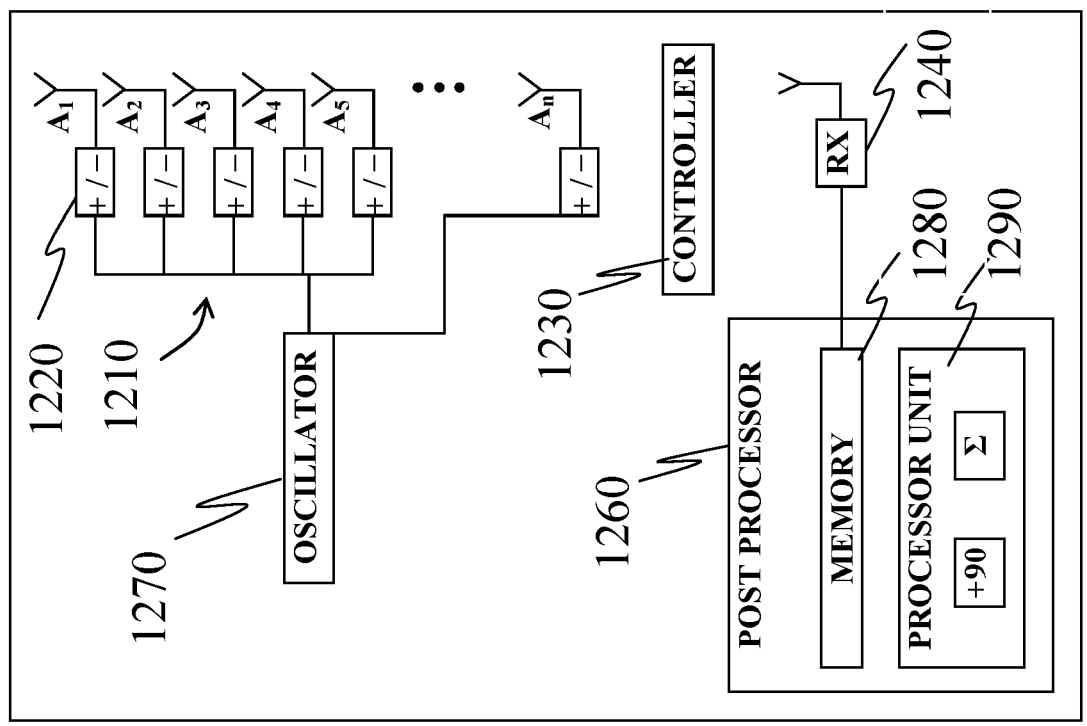
FIG. 2A is a block diagram schematically representing selected elements of a first embodiment of a system for simulating quadrature phase-shift keying (QPSK) beam forming.

Referring now to the block diagram of FIG. 2A, selected elements are represented of a first embodiment of a system for simulating quadrature phase-shift keying (QPSK) beam forming in an antenna array 1200. The system includes a transmitter 1250, an antenna array 1210, a binary phase shifter 1220 associated with each transmitting antenna, a controller 1230, a receiving antenna 1240; and a post processor 1260.

The transmitter 1250 is configured and operable to generate an oscillating signal for transmission by the antenna array 1210. It is noted, that where appropriate, the transmitter 1250 may be further operable to generate a signal sweeping through a range of frequencies, or a chirp.

The antenna array 1210 includes a number of antennas A1-$n$. Each antenna is operable to transmit the signal generated by the oscillator 1270 simultaneously with a required phase shift. It will be noted that the superposition of the transmitted signals from all the antennas in the array produces an overall signal beam having a characteristic shape.

The binary phase shifter 1220 associated with each transmitting antenna A$n$ is configured and operable to selectively apply a phase shift of 180 degrees to the oscillating signal as required. Alternatively, if the binary phase shifter 1220 is not activated, no phase shift is applied to the oscillating signal. Accordingly, the signal transmitted by the associated antenna is either in phase or in anti-phase with the oscillating signal produced by the oscillator 1270, as required.

The controller 1230 is configured to send activation instructions to the binary phase shifters 1220 such that only the required antennas transmit phase shifted signals.

The (one or more) receiving antenna 1240 is configured to receive return signals reflected from targets.

The post processor 1260 is operable to manipulate received signals and includes a memory 1280 element and a processing unit 1290. The memory element 1280 is operable to save received signals. The processing unit is operable to apply phase shifts to selected received signals stored in the memory 1280, and further operable to sum received signals stored in the memory 1280.

In particular examples, the processing unit may apply a 90 degree phase shift to selected received signals and to sum these with other received signals to produce a required output signal.

Accordingly, the controller may be operable to determine a required complex steering vector C=R+jI for each antenna of the array. The complex steering vector C includes a binary real component R selected from +1 and −1 and a binary imaginary component I selected from +1 and −1. The value of +1 indicates that no phase shift is required and the component of −1 indicates that a phase shift is required. Thus the real component may represent a required phase shift selected from 0 and 180 degrees and an imaginary component may represent a required phase shift selected from 90 and 270 degrees, all with reference to the R=+1, I=+1 combination.

Referring now to the graphs of FIG. 2B which indicate a possible set of profiles showing an example of how the phase of the transmitted signal S1-$n$ from each transmitter antenna A1-$n$ of the first embodiment may change over time.

It is noted that the phase shift of each antenna remains fixed for a given time interval Δt. Each antenna An receives a unique profile determined by the required steering vector Ci at that time. Each complex steering vector Ci may determine the required phase shifts for two consecutive time intervals Δti, Δti+1.

During a first time interval Δti, the controller instructs binary phase shifters 1220 of antennas A1-$n$ having an associated steering vector Ci with a real component Ri of −1 to apply a 180 degree phase shift to the transmitted signal.

During a second time interval Δti+1, the controller instructs binary phase shifters 1220 of antennas having an associated steering vector Ci with an imaginary I component of −1 to apply a 180 degree phase shift to the transmitted signal.

Accordingly, the post processor 1260 may be operable to store reflected signals received during the first time interval and the second time interval in the memory. The processor unit may then apply a 90 degree phase shift to signals received during the second time interval before summing the signals received during the first time interval to 90 degree phase shifted signals received during the second time interval.

The resulting output signal from the post processor will have the characteristics of a quadrature phase shifted signal.

Figure 2C:
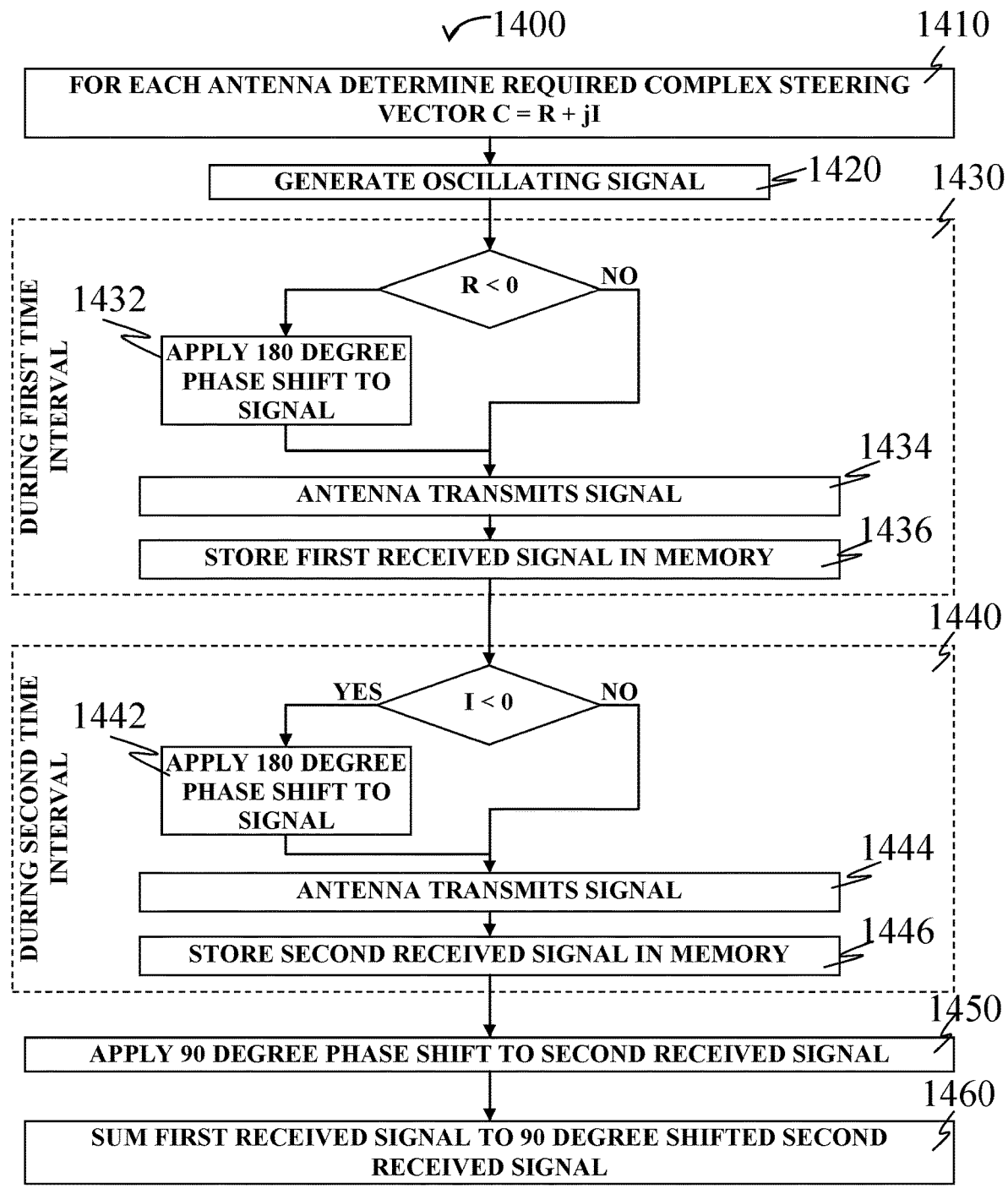
FIG. 2C is a flowchart indicating selected steps in a method for simulating quadrature phase-shift keying (QPSK) beam forming with the system of the first embodiment.

Referring now to the flowchart of FIG. 2C, selected steps are indicated of a method 1400 for simulating quadrature phase-shift keying (QPSK) beam forming with the system of FIG. 2A in which the antennas of the array 1210 are each connected to a common transmitter via a binary phase shifter 1220.

For each transmitting antenna of the array a required complex QPSK steering vector C is determined 1410 comprising a real component R selected from +1 and −1 and a binary imaginary component I selected from +1 and −1.

The transmitter generates an oscillating signal 1420 which is passed to each antenna via the binary phase shifter. Optionally, each transmitted signal may sweep over a range of frequencies during each time interval.

During a first time interval 1430, for each transmitting antenna having an associated steering vector with a real component R of +1, the associated binary phase shifter applies a 180 degree phase shift to the transmitted signal 1432, the antenna transmits the signal 1434 and the received signal is stored in the memory of the postprocessor 1436.

During a second time interval 1440, for each transmitting antenna having an associated steering vector with an imaginary component I of +1, the associated binary phase shifter applies a 180 degree phase shift to the transmitted signal 1442, the antenna transmits the signal 1444 and the received signal is stored in the memory of the postprocessor 1446.

The post processor may then apply a 90 degree phase shift to signals received 1450 during the second time interval 1440 and sum the signals received during the first time interval to 90 degree phase shifted signals received during the second time interval 1460.

A particular feature of the systems and methods described herein is the linear combination of the received signal over several time intervals in order to simulate and benefit from the advantages of an enhanced beamformer in a simulated manner. This feature can be extended in various forms which will be clear to those skilled in the art and are mentioned here as examples.

In one extension where the transmitter already supports beamforming using a certain choice of phases (e.g. 4 phases QPSK, 8 phases 8-PSK, etc), or gains, the combination of M codewords (two or more) over M time intervals can be used in order to generate a larger choice of phases by factor M (as for example, using 4 time intervals with BPSK or 2 time intervals with QPSK to generate simulated 8-PSK).

The simulated QPSK scheme can be alternatively described by taking a desired phasor C per transmit antenna, transmitting $X=\text{Sgn}(\text{Re}\{C \cdot e^{-j\phi}\})$, where $\phi$ is 0 for the first interval and 90 degrees for the second interval, and then compensating for this phase in the received by multiplying with $e^{j\phi}$. In another extension of the current invention, the sequence of the "modulating" phase $\phi$ can be chosen in different ways over time, for example in different scanned frequencies or frames.

In another extension of the invention, the received signals over the M intervals are combined with arbitrary phasors $a_1, \ldots a_M$ not necessarily having unit gain (instead of $a_1=1$, $a_2=j$ for the case of QPSK as described herein). The beamforming codewords over these M intervals are chosen in a way that their linear combination weighted by $a_1, \ldots a_M$ yields desired characteristics (such as a high peak to side-lobe level).

The method described above for implementing QPSK (4 phases) beamforming by using binary phase shifters and two time-intervals is presented for illustrative purposes only. This method may be further generalized to implement any even number 2n of phases over n time-intervals. For example, with three time-intervals, a 6-PSK modulation may be achieved.

For N time intervals, a method may be implemented in which a transmitter applies a 180 degree phase shift selectively to particular antennas according to the following conditions. In the n-th time interval, a 180 degree phase shift is applied to the k-th antenna if the real value of the steering vector rotated by −n*180/N degrees is negative. Thus, for the k-th antenna a 180 degree phase shift is applied if the following formula is true:

$$\text{Real}(C_k^* e^{-j*\varphi[n]}) < 0,$$

where $C_k$ is the k-th component of the steering vector, and $\varphi_n = \pi n/N$ is the rotation sequence.

Accordingly, where appropriate, in the post-processor, a rotation of $\varphi n$ radians may be applied for the n-th time-interval, before summation of the received signal in all time intervals.

A method such as described herein may be extended to incorporate further criteria for the desired beamformer, by choosing a set of N phase shift sequences such that the mean of the transmitted signal over the N time intervals satisfies the desired criteria. For example, effective attenuation for a specific transmitter antenna may be required for gain control for apodization and transmitter gain equalization. This may be achieved, even without analog gain control, by using a specific rotation sequence for a specific transmit antenna, for example the steering vector for each antenna may be rotated by an angular step $(1-a)*\varphi n$, say, where the value of a is selected specifically to suit each transmitter antenna).

The multiple time-intervals, needed for applying the described method, may further be used for other purposes. In one possible embodiment, multiple time-intervals may be used to allow Doppler processing within each Frame, in order to allow for an integration time that may be longer than the channel coherence time as well as for obtaining information regarding the velocity of targets. Each spatial transmitter direction to be scanned may include N time-intervals, and the Doppler post-processing may search for a linear phase shift between intervals that may correspond to a radial velocity. This may be implemented, for example using a Fast Fourier Transformation (FFT) over the time-intervals.

It is noted that, where appropriate, each time-interval may itself include sweeping the transmitted signal over multiple frequencies using a stepped frequency continuous wave, a Chirp or some other frequency function over time for the duration of the time-interval. Accordingly, by changing the beamformer between time-intervals as described above sidelobe levels would typically be reduced due to phase quantization at any given velocity. Nevertheless, the associated beamforming quantization errors may generate sidelobes at other velocities.

It is another feature of the current method that the spectral shape of the sidelobes which are generated may be controlled by selecting a specific order for the time-intervals, such that most of the quantization noise which generates the sidelobes is limited to high frequencies, which correspond to radial velocities higher than those expected in the specific application. Where required, the phase rotation $\varphi n$ for the n-th time-interval (where n may take any integer value from 0 to N-1), may be selected such that:

$$\varphi_n = \pi * [(n*(N-1)/2) \mod N],$$

where the "mod" is the modulo operation which returns the remainder of division by a given integer and it is assumed that N is an integer multiple of 4. As above, the 180 degrees rotation may be applied in the transmitter only if Real $(C_k * e^{-j*\varphi[n]}) < 0$, and the post-processor applies a rotation by $\varphi_n$. With such a reordering of the time-intervals, most of the sidelobes power resides at the Nyquist frequency of the Doppler.

It will be appreciated that other constructions may be used for selecting the order in the phase rotation sequence, or the sequence of steering vectors, so as to optimize the spectral shape of the quantization noise, as suit requirements.

In the construction above, a known required steering vector is rotated by $\varphi_n$ for the binary phase selection. An alternative approach, for example where the required steering vector is not known, may involve searching for the phase selection at the transmitter for which the value of Real(H($\{b_k\}$))*exp(j*$\varphi_n$)) is maximal, where H($\{b_k\}$) is the phasor representing the combination of all transmitting antennas in the desired spatial direction with a specific phase selection $b_k$. Such maximization can be performed in various ways for example by exhaustive search over all binary phase combinations (with K transmit antennas there are $2^K$ options). H may be obtained, for example, by analysis of direct measurements of electromagnetic waves reflected by a reference target located in a desired spatial direction.

The number of time-intervals may be selected so as to achieve the required beamforming accuracy in terms of, for example, sidelobes level, signal to noise ratio (SNR) (possibly using a longer integration time by adding intervals) and Doppler estimation resolution. On the other hand, the number of time intervals may be limited by other factors such as memory capacity and processing power of the electronic components, and avoidance of blur in the Frame. Accordingly, the actual number of time-intervals selected may be a compromise of all these considerations.

As some spatial directions might be more important than others, in terms of the needed SNR and Doppler resolution, it may be preferred that more time-intervals are allocated to those preferred directions, and fewer to other lower priority directions.

This scanning scheme may be used in various applications such as an exterior car radar sensor, used for ADAS (Advanced Driver Assistance System) or autonomous driving. In such an application, it will be appreciated that the horizontal angular range of interest (azimuth range) is typically wider than the vertical angular range of interest, (elevation range). This is because the car radar sensor is not generally required to scan beneath the road surface. Accordingly, it may be preferred to align the transmitter antennas in a vertical linear array such that the side lobes lie outside the high priority elevation range. The receiver antennas may be arranged in an orthogonally orientated horizontal linear array.

Other possible applications may include the monitoring of an enclosed space such as a room, a playing field, a goal-line or the like. Still other applications may involve the tracking of objects within a target region, possibly using large-arrays for body-scanning. Still other applications will occur to those skilled in the art.

Referring now to the block diagram of FIG. 3A, which schematically represents selected elements of a second embodiment of a system in which each antenna is connected to gain control unit 1550 such that quadrature amplitude modulation (QAM) beam forming may be simulated.

In addition to the components shown in the first embodiment system of FIG. 2A, a dedicated gain control unit 1530 is associated with each transmitting antenna. Accordingly, the controller is further configured to instructions to the gain control units to amplify the transmitted signal by a required gain determined by the complex steering vector.

The controller may again be operable to determine a required complex steering vector C=R+jI for each antenna of the array. Here, however, the steering vectors may have a continuous real component R selected from the range +1>R>-1 and a continuous imaginary component I selected from the range +1>I>-1.

Accordingly, the controller may be further operable to select a required amplitude R for the real component of the associated steering vector and during the first time interval instruct the associated gain control unit to apply an associated first gain GR to the transmitted signal. Similarly the controller is operable to select a required amplitude I for the imaginary component of the associated steering vector and during the second time interval instruct the associated gain control unit to apply a second gain GI to the transmitted signal wherein the second gain GI is equal to the product of GR and the absolute ratio of I to R.

Referring to the set of graphs shown in FIG. 3B, the resulting signals produced by each antenna during each time period may thus be amplitude modulated as well as phase modulated.

Figure 3C:
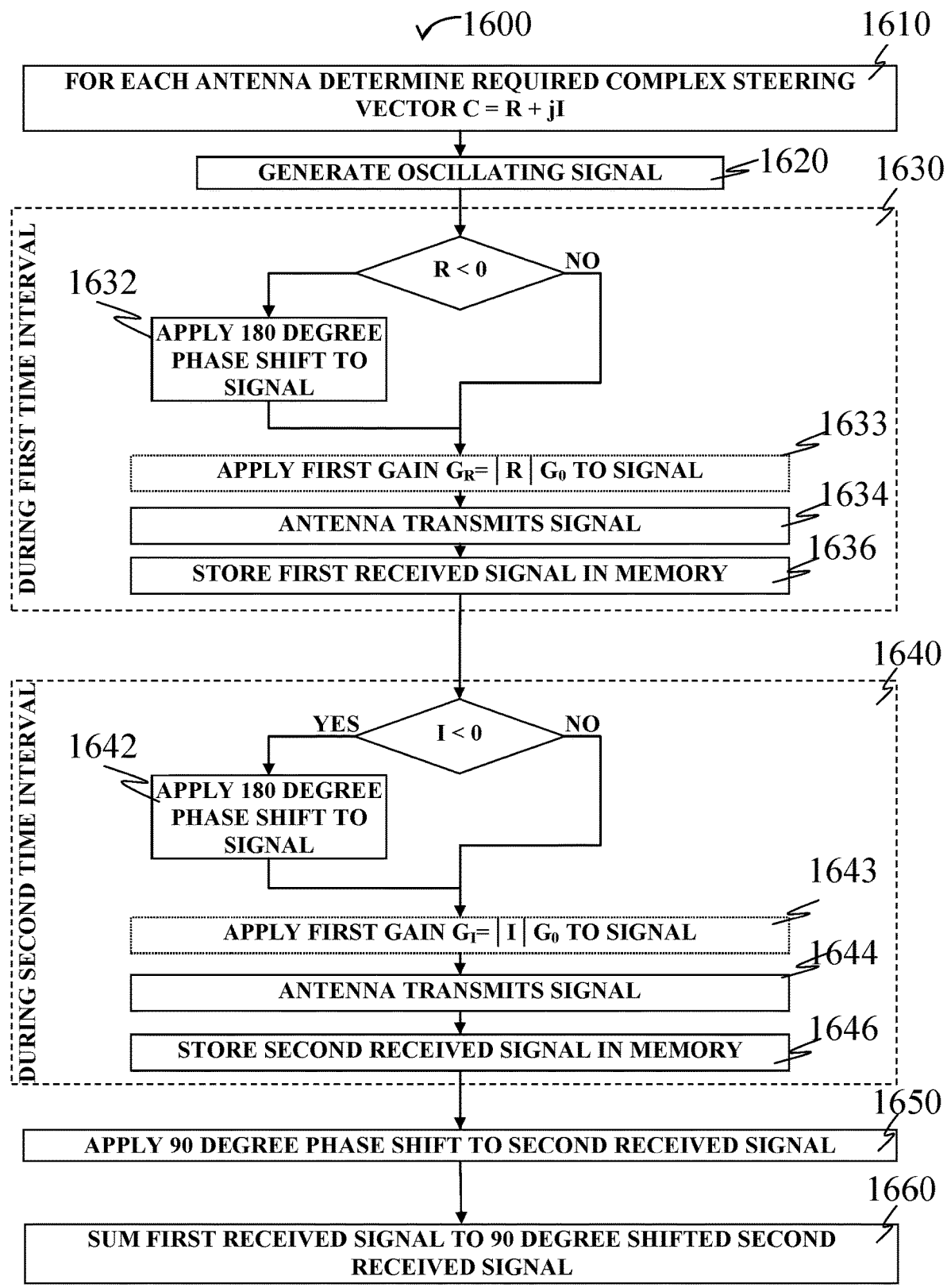
FIG. 3C is a flowchart indicating selected steps in a method for simulating quadrature phase-shift keying (QPSK) beam forming with the system of the second embodiment.

Referring now to the flowchart of FIG. 3C, selected steps are indicated of a method for simulating quadrature amplitude modulation (QAM) beam forming with the system of FIG. 3A in which the antennas of the array are each connected to a common transmitter via an associated binary phase shifter and a gain control unit 1530.

For each transmitting antenna of the array a required complex QPSK steering vector C is determined 1610 comprising a real component R selected from the range +1>R>−1 and an imaginary component I selected from the range +1>I>−1.

The transmitter generates an oscillating signal 1620 which is passed to each antenna via the binary phase shifter. Optionally, each transmitted signal may sweep over a range of frequencies during each time interval.

During a first time interval 1630, for each transmitting antenna having an associated steering vector with a negative real component R, the associated binary phase shifter applies a 180 degree phase shift to the transmitted signal 1632. The associated gain control unit amplifies the signal by a first value GR=|R|G0 1633, the antenna transmits the amplified signal 1634 and the received signal is stored in the memory of the postprocessor 1636.

During a second time interval 1640, for each transmitting antenna having an associated steering vector with a negative imaginary component I, the associated binary phase shifter applies a 180 degree phase shift to the transmitted signal 1642. The associated gain control unit amplifies the signal by a second value GI=|I|G0 1643 Then the antenna transmits the amplified signal 1644 and the received signal is again stored in the memory of the post-processor 1646.

Accordingly, when the post processor may applies a 90 degree phase shift 1650 to signals received during the second time 1640 interval and sums these signals 1660 with the signals received during the first time interval, the resultant signal may have a virtual phase shift of any value required.

Figure 4B:
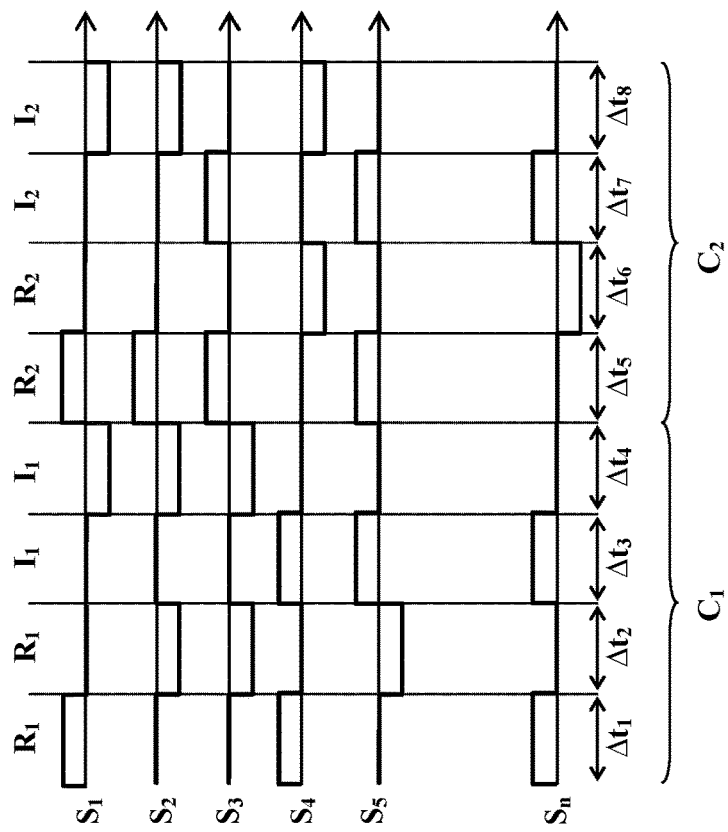
FIG. 4B are set of graphs indicating a possible set of profiles showing an example of how the phase of the transmitted signal from each transmitter antenna of the third embodiment may change over time.
Figure 4A:
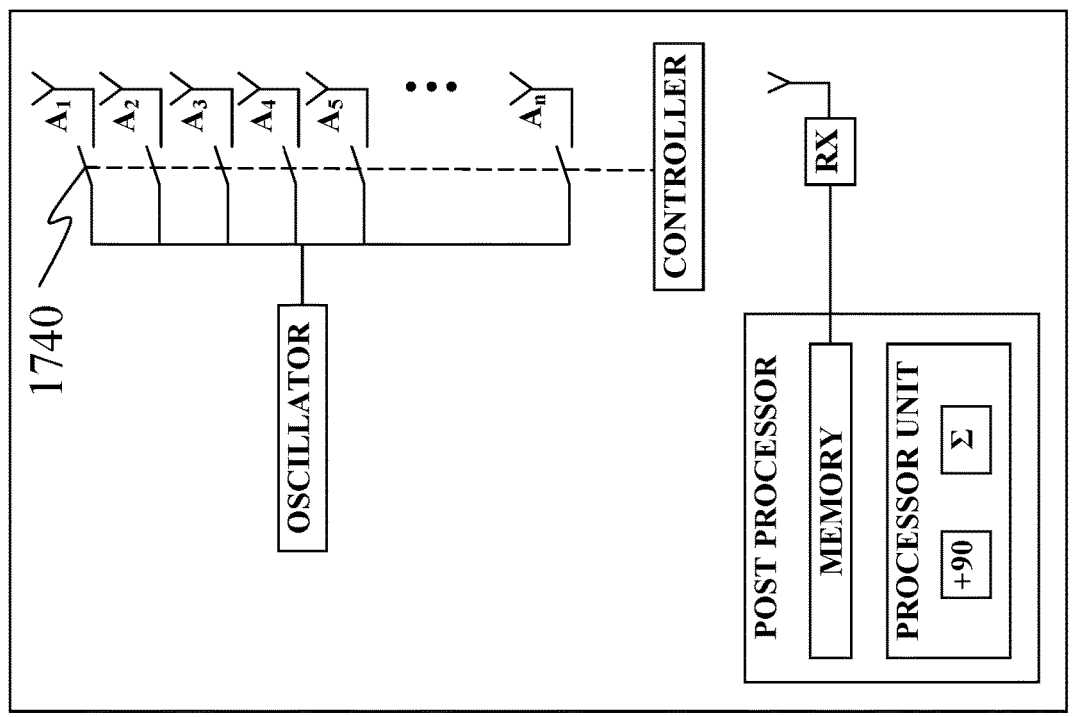
FIG. 4A is block diagram of a system including a common binary phase shifted shared by all antennas according to a third embodiment.

It is further noted that although systems described herein include a dedicated binary phase shifter for each antenna, alternative systems may operate without phase shifters, by utilizing additional time intervals, as illustrated in FIG. 4A.

Using such a system may be enabled by activating only those antennas having a real component of +1 for a first time period without a phase shift, activating only those antennas having a real component of −1 for a second time period where a phase shift of 180 degrees is applied at the receiver, activating only those antennas having an imaginary component of +1 for a third time period without a phase shift, activating only those antennas having an imaginary component of −1 for a fourth time period and applying a phase shift of 180 degrees at the receiver.

It is further noted that provided that each antenna of a system has an independently controllable connecting switch 1740, such as illustrated in FIG. 4A, it may be possible to apply such phase shifts directly from the oscillator 1770 or during post processing. Additionally or alternatively, a common binary phase shifter may be connected to multiple transmitting antennas as required.

An example of the signal profiles produced by an example of such a system are presented in FIG. 4B. The post processor may store received signals from each of the first time period, the second time period, the third time period and the fourth time period in the memory.

The four signals may be summed by the receiver after applying a 0, 180, 90, 270 degree phase shift to the first, second, third and fourth step, respectively. By summing all these signals a simulated QPSK steering vector may be achieved in a system without phase shifters.

Still further extensions of the linear combination of a received signal over multiple time intervals will occur to those skilled in the art.

An antenna is a basic medium for any type of communication system. In order to transmit and receive the communication, an antenna needs to produce strong waveforms. Apart from strength of the antennas, alignment and positioning thereof plays a pivotal role in better communication and uniformity therein. Traditionally, phased arrays involving an array of antennas in just forward direction may not provide a true 180 degrees field of view especially in far field view. FIG. 5 illustrates the traditional phased array system 100. The system 100 consists of an array of antennas 102 powered by a transmitter (TX) 104. The feed current for each antenna 102 passes through a phase shifter ($\varphi$) 106 controlled by a central controller (C) 108. The curved lines 110 show the wavefronts of the radio waves emitted by the antenna array 102. The individual wavefronts are spherical, but they combine (superpose) in front of the antenna to create a plane wave, a beam of radio waves travelling in a specific direction. Creating each of the single antennas with 180 degrees field of view generally results in low directivity and high phase non-linearity.

The multi antennas bi-static MIMO arrays are extensively used in various applications requiring high resolution. In theory the MIMO phase arrays can be used for up to 180 degrees imaging. Conventionally, the MIMO antenna arrays are arranged in a particular direction to provide directional capability and high gain. FIG. 6A illustrates a system 200 comprising array of antennas (202a, 202b . . . 202f) installed in forward-looking direction on a circuit board 204. FIG. 6B illustrates the radiation pattern 206 of the system 200 in the boresight direction and FIG. 6C illustrates the radiation pattern 210 of the system 200 in the end-fire direction. However, such arrays have certain disadvantages. Forward looking antennas tend to have high gain in the boresight direction, with lower gain at the end-fire direction. If both the transmitting and the receiving antennas are forward looking, the gain deficiency may be multiplied. In addition, such antennas may also tend to have linear phase in the boresight direction, with high phase non-linearity in the end-fire direction. If both the transmitting and the receiving antennas are forward looking, such phase non-linearity may multiply leading to poor reception and transmission capability of the system.

Hence, the current solutions using planar antennas for 180 degrees field of view have disadvantages in angular range, gain and phase non-linearity.

In light of the above limitations, it is desirable to have MIMO array antenna processing systems which have antennas arranged such that the systems achieve high gain and linearity throughout especially in applications involving a larger field of up to 360 degree view. The imaging system of the present invention described herein comes to address this need.

Figure 7A:
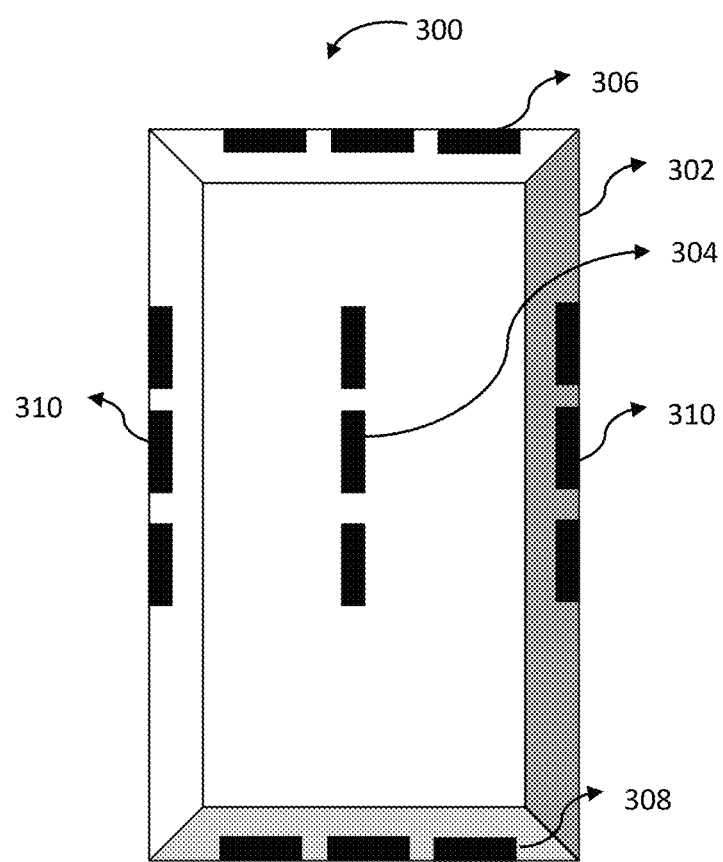
FIG. 7A-C shows various arrangements of a MIMO based antenna system 300 according to embodiments of the invention.

FIG. 7A illustrates a schematic view of a system 300 involving array of MIMO based antennas on a Printed Circuit Board (PCB) 302 in accordance with an embodiment of a present invention. The system 300 includes a plurality of first antennas 304 disposed on face of the PCB 302, a plurality of second antennas (not shown) disposed on back side of the PCB 302, a plurality of third antennas 306 disposed on upper part of the PCB 302, a plurality of fourth antennas 308 disposed on lower part of the PCB 302, and a plurality of fifth antennas 310 on both the side corners of the PCB 302. The antennas 304 and 310 provide high gain and phase linearity in the boresight direction, while the antennas 306 and 306 provide high gain and phase linearity in the end-fire direction, thereby maintaining high gain and phase linearity in all the directions.

In some embodiments, the first antennas 304 are configured to transmit and receive signals from the objects or any hindrances in forward direction. For example, a car having the first antennas 304 may be configured to track any vehicle coming on the way to the car from the front direction and may communicate therewith. The first antennas 304 may also be used to calibrate targets in forward direction in case of military cars or jeeps or fighter jets.

In some embodiments, the second antennas are configured to transmit and receive signals from the objects or any hindrances in backward direction. For example, a car having the second antennas may be configured to track any vehicle coming from back side of the car and hitting thereto or trying to overtake thereto. Such a scenario may also require communication of the two vehicles. The second antennas may also be used to calibrate targets in backward direction in case of military cars or jeeps or fighter jets.

In some embodiments, the third antennas 306 are configured to transmit and receive signals from the objects or any hindrances overlying thereto. For example, a car having the third antennas 306 may be configured to track any aircraft or bird flying over the car. In another example, the car having the third antennas 306 may be configured to track if any object falling over the car. Such a scenario may also be required to provide alert communication to the car. The third antennas 306 may also be used to calibrate targets in upward direction in case of military cars or jeeps or fighter jets when targeted by the enemies there over.

In some embodiments, the fourth antennas 308 are configured to transmit and receive signals from the objects or any hindrances under thereto. For example, a car having the fourth antennas 308 may be configured to track any object beneath the car. For example, speed breakers having high altitude, or any pits. Such a scenario may also be required to provide alert communication to the car. The fourth antennas 308 may be used to calibrate targets in downward direction in case of fighter jets.

In some embodiments, the fifth antennas 310 may be configured to transmit and receive signals from the objects or any hindrances from sides thereof. For example, a car having the fifth antennas 212 may be configured to track any vehicle overtaking the car. Such a scenario may also be required to provide alert communication to the car. The fifth antennas 310 may also be used to calibrate targets in sideways direction in case of military cars or jeeps or fighter jets.

The application scenario of antennas of the system 300 disclosed above are exemplary in nature and should not limit the scope of the invention.

In some embodiments, the antennas 304, 306, 308, and 310 may be aligned at any angle depending upon the requirement thereof.

Figure 7B:
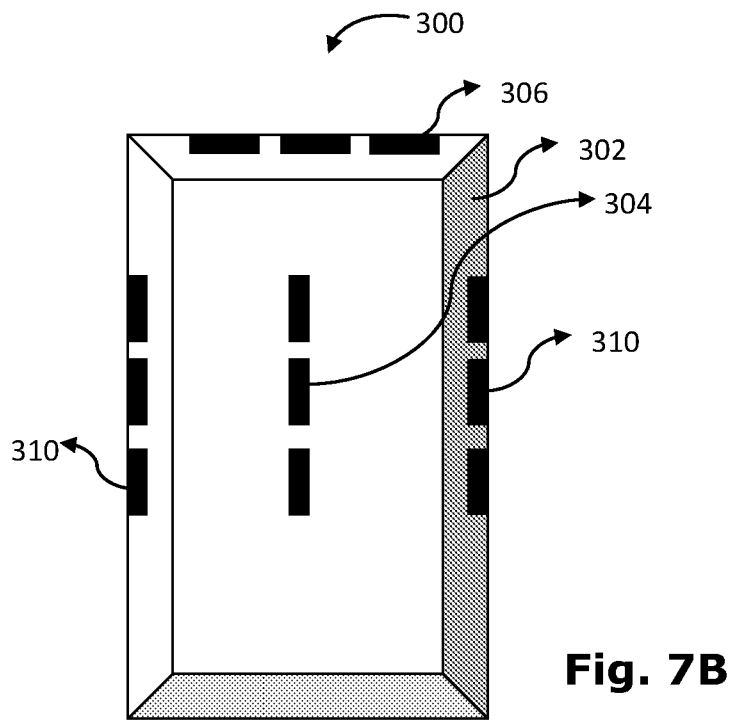
Figure 7C:
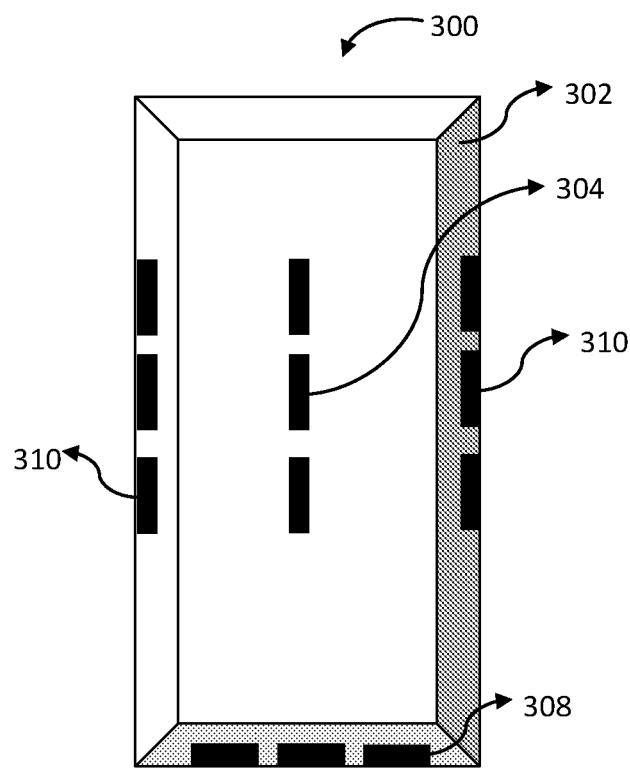

FIGS. 7B and 7C show additional embodiments of the system 300. The system 300 has antennas only on one part of the PCB 302. In FIG. 4A, the antennas are aligned only on the upper part of the PCB 302 while in 4B, the antennas are aligned only on the lower part of the PCB 302. In such cases, the gain and linearity may be achieved however, may be less as compared to that of system 300 shown in FIG. 3.

In alternative embodiments, the upper part antennas are disposed on front side of the PCB 302 while the lower part antennas are disposed on the back side of the PCB 302 providing high gain and phase linearity. In another alternative arrangement, the upper part antennas are disposed on back side of the PCB 302 while the lower part antennas are disposed on the front side of the PCB 302 providing high gain and phase linearity.

Further embodiments of the present invention may employ multichip module systems wherein the antenna array are disposed on multiple circuit boards providing super-hemispherical radar coverage. For example, both circuit boards 302 of FIGS. 7B and 7C can be electronically assembled into a single device forming a multichip module system. Each of the circuit boards 302 has own processor in the form of a control chip forming a multi-module system. The multi-module configuration of the system 300 improves performance and reduces cost. Exemplary Multi-chip module technologies which can be used includes, but not limited to, the IBM Bubble memory MCMs, Intel Pentium Pro, Pentium D Presler, Xeon Dempsey and Clovertown, Sony memory sticks and similar devices. All the circuit boards 302 are configured to be networked together for ease of management and control.

It should be clearly understood that the number and arrangement of antennas disclosed above are exemplary in nature and should not limit the scope of the invention.

Figure 8:
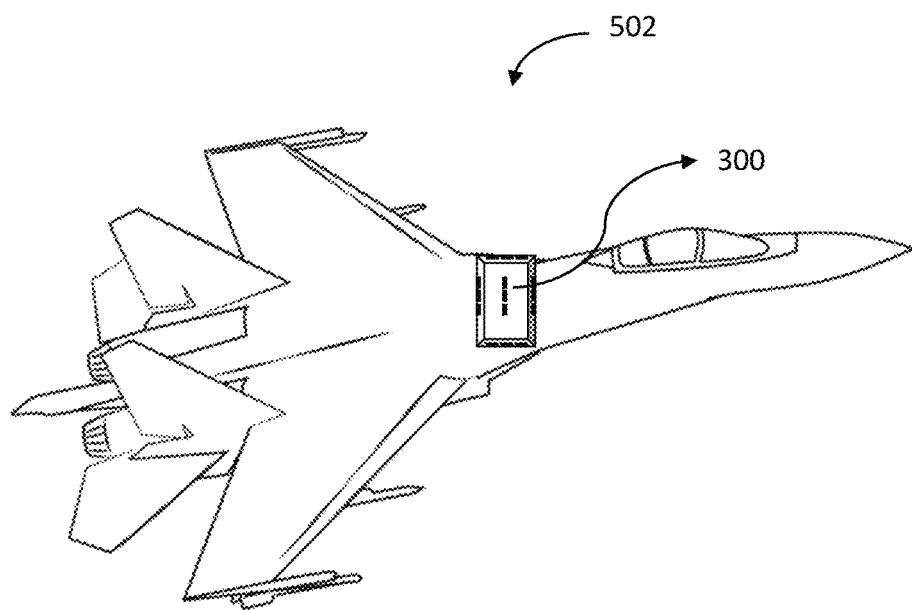
FIGS. 8 and 9 illustrate exemplary deployment of the MIMO based antenna system in larger field of view applications—fighter jets and cars, respectively.
Figure 9:
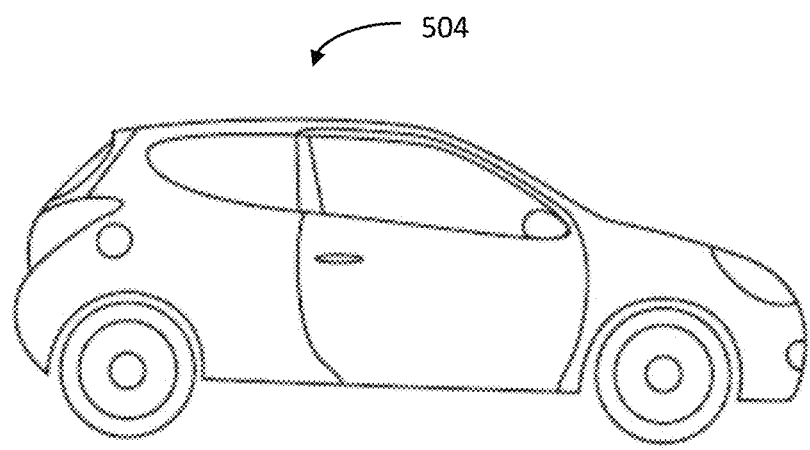

FIG. 8 illustrates an exemplary application of the invention with installation of the system 300 in a fighter jet 502. The jet 502 may be required to track objects or persons or any danger in all the directions i.e. requiring 360 degree view. The jet 502 may be configured to look down in forward direction, backward direction, upward direction, downward direction, and along both the sideways thereof. In some embodiments, the jet 502 may be configured to calibrate targets such as missiles or bullets in forward direction, backward direction, upward direction, downward direction, and along both the sideways thereof. Such a tracking may be configured through the antennas 304, 306, 308 and 310 in respective alignments as discussed hereinabove. Such an array of antennas may provide linearity in the wave signals transmission. Such an array of antennas may provide high gain in both boresight direction as well as the end-fire direction, hence achieving high gain through the system 300. FIG. 9 illustrates another exemplary application of the invention with installation of the system 300 in a car 504.

For any persons skilled in the art, it is exemplified that the exemplary embodiments of jet 502 and the car 504 are illustrated to explain the system 300 to make the persons skilled in the art understand the present invention. However, the system 300 is compatible to be installed in any kind of environment such as imaging, target calibration, and so on requiring super-hemispherical radar coverage.

In addition to above mentioned advantages of the system 300, due to the illumination field of view of the upper and lower part respective antennas 306 and 308, reflectors (not shown) in front of the array will have much lower effect on imaging in the end-fire direction, than when using the planar antennas for the imaging. This will result in reduced effects and improve detection capabilities of end-fire targets.

The combinations of arrays on different facets, or combining broadside and endfire antenna elements, may variously operate jointly as a single MIMO radar array or as a combination of separate radar arrays as required. In particular, in some modes of operation the transmitting elements may be broadside elements while the receiving elements may be endfire elements, or vice versa. Alternatively or additionally the transmitting and receiving antennas may be arranged on different facets. The MIMO reconstruction in such embodiments may account not only for the location of the elements, but also for different spatial radiation patterns.

Figure 10:
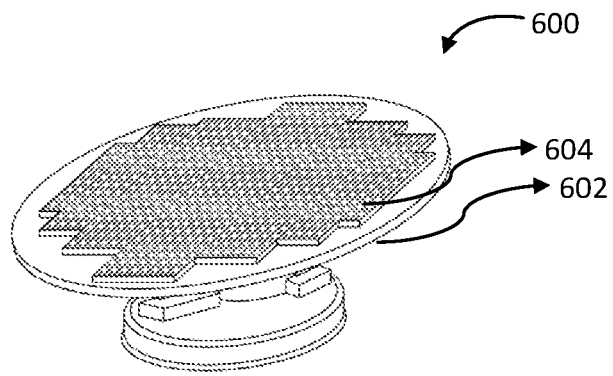
FIG. 10 illustrates how a steering vector may be generated by QPSK phase shifting of the phase of selected antennas by 0, 90, 180 or 270 degrees.

Referring to FIG. 10, a Printed Circuit Board (PCB) mounted radar system 600 may include a PCB base 602 and a number of antennas 604 mounted thereon. The antennas 604 may be configured to transmit and receive radiations with a particular object in an area. For example, vehicles such as cars moving on the road need communicating with each other such as vehicle to vehicle communication systems involving self-driven cars exchanging information such as speed, location, direction of travel, braking, loss of stability, and so on.

However, since there is a plurality of receiving and transmitting antennas mounted over the PCB, there is a great possibility of diversion of the radiations transmitted and hence causing less gain in the output. The attenuation and distortion of the signal is dependent upon multiple factors including, the receiving and transmitting antennas, medium of propagation, propagation distance, the status (moving or stationary) of the target object, etc.

In light of the above limitations, it is desirable to have PCB mounted radar systems configured such that there is a maximum output and precision in targeting during transmission of the radiations. The PCB mounted radar system of the present invention described herein comes to address this need.

Figure 11:
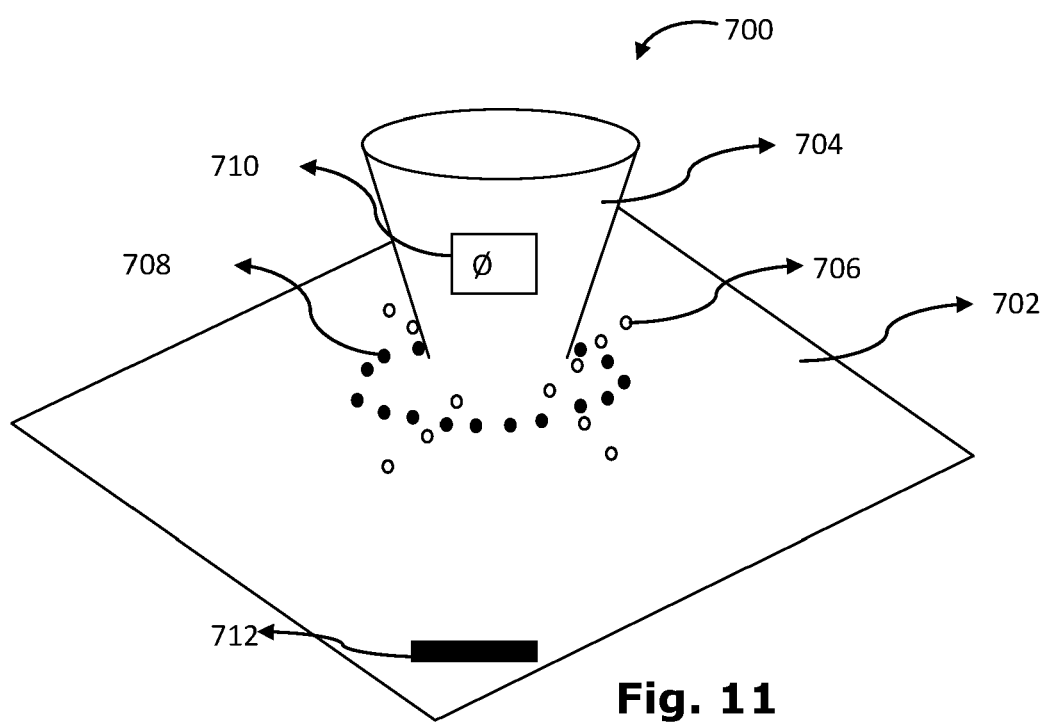
FIG. 11 illustrates a schematic view of a PCB mounted radar system, in accordance with an embodiment of a present invention.

FIG. 11 illustrates a schematic view of a PCB mounted radar system 700, in accordance with an illustrative embodiment of the present invention. The system 700 includes a PCB board 702 onto which an array of transmitting antennas 706 (shown as unfilled circles), and receiving antennas 208 (shown as filled circles) are mounted thereon. The transmitting antennas 706 are configured to transmit radiations of a particular wavelength. The receiving antennas 708 are configured to receive radiations from an object of a target area. Since there is a plurality of both the antennas 706, and 708, there is a possibility of deviation of the radiations from reaching a particular target area.

The system 700 also includes a beam deflecting device in the form of a wave deflection mechanism such as a refractor or reflector 704 configured to direct the beam of waves transmitted from the transmitting antennas 706 radially away from the board 702 in all the directions. The wave deflection mechanism 704 is shown in form of a conical mirror mounted on the PCB 702. The signal waves transmitted by the transmitting antennas 706 are incident upon a surface of the reflector 706 and are directed radially away parallel to the surface of the board 702. The wave deflection mechanism 704 is oriented such that the array of receiving antennas 708 receives the reflected waves from objects within the target region. Such waves are incident radially towards the reflector in a direction perpendicular to the board 702. The wave deflection mechanism 704 geometry can be selected by varying the radius of the cone according to its height to adjust the elevation and angle of signal transmission and reception. The wave deflection mechanism 704 geometry is also dependent upon the number and spacing between the antennas (706 and 708).

In some embodiments, the wave deflection mechanism, such as a reflector 704 may be placed in center of the board 702. In some embodiments, the wave deflection mechanism 704 may be placed anywhere on the board 702 as per the requirements. The array of transmitting antennas 706 is arranged in spokes extending away from the base of the wave deflection mechanism 704. In some embodiments, the array of receiving antennas 708 is arranged in a circle around the base of the wave deflection mechanism 704. Alternatively, array of transmitting antennas 706 is arranged in a circle around the base of the wave deflection mechanism 704. Further, the array of receiving antennas 708 is arranged in spokes extending away from the base of the wave deflection mechanism 704. In another embodiment of the present invention, both the arrays of transmitting antennas 706 and receiving antennas 708 are arranged in circles around the base of the reflector 704 with the array of transmitting antennas 706 forming an inner circle and the array of receiving antennas 708 forming an outer circle around the base of the wave deflection mechanism 704. Alternatively, the array of transmitting antennas 706 can be arranged in an outer circle and the array of receiving antennas 708 can be arranged in an inner circle around the base of the wave deflection mechanism 704. It should clearly understood that any other arrangement of transmitting antennas 706 and the receiving antennas 708 is possible on the PCB 702 without limiting the scope of the invention.

In a preferred embodiment, the transmitting antennas 706 are spaced at a distance of less than half a wavelength from each other. Similarly the receiving antennas 708 are spaced at a distance of less than half a wavelength from each other. In some embodiments, the antennas 706, and 708 may be arranged such that the spacing thereof is smaller than a typical half wavelength. When the antenna array is directed towards the wave deflection mechanism 704, spacing of the antennas 706, 708 in the image of a reflector mirror needs to be half a wavelength apart. This enables closed spacing of the antennas 706 and 708 on the PCB 702. Further, in case of a diverging mirror, for example a convex mirror shaped reflector 714 shown in FIG. 12A, the transmitting antennas 706 may be spaced more closely upon the board 702.

Figure 13:
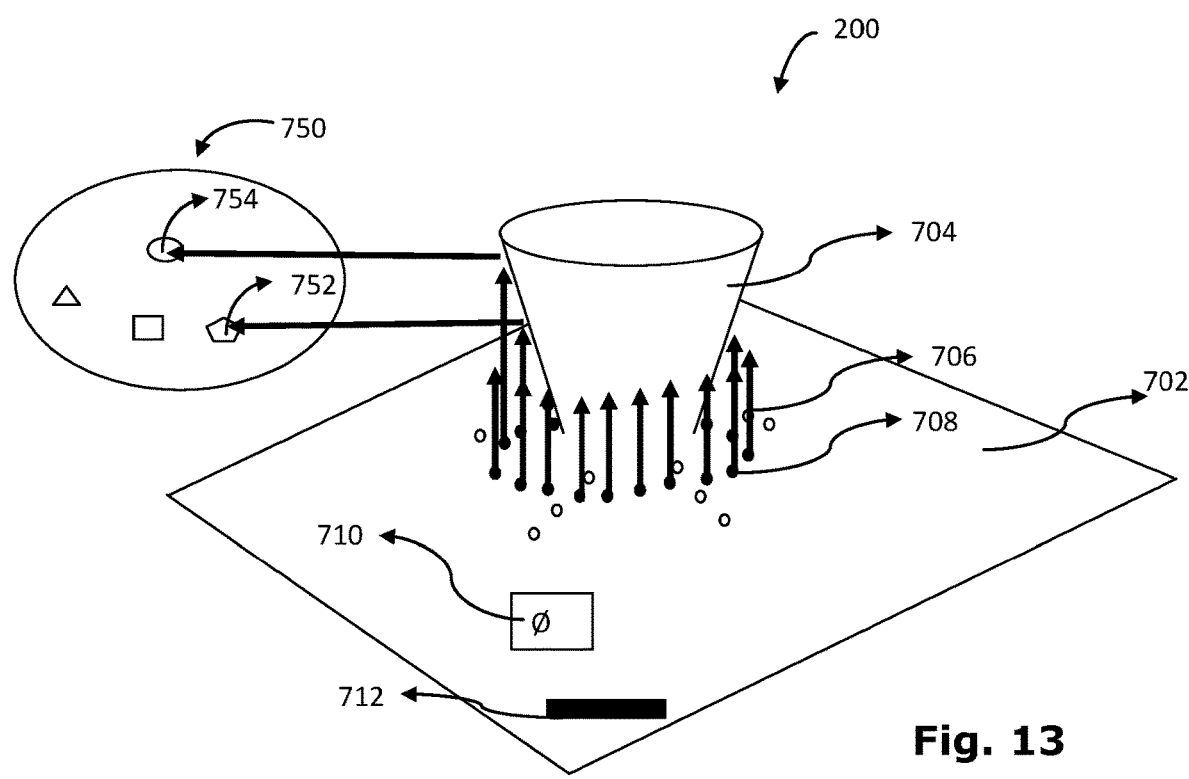
FIG. 13 illustrates a schematic view of the PCB mounted radar system targeting particular objects.

The transmit antennas may be scanned in various forms, which may include transmit one by one, transmit a codebook of predetermined transmit signals, or beamform toward specific directions, etc. The received signal from the receive elements may be processed in an analog or digital way to produce an image. In any case, the beamforming weights, or phases, are tuned to take into account the effect of the reflector on the time delays and amplitudes as function of the transmitted/received wave direction. In some embodiments, the radar PCB 702 includes a phase shift element 710 which may be used to compensate for the different path lengths resulting from the reflected waves. The phase shift element 710 is configured to shift the phase angle of the waves transmitted from the reflector 702 for directional signal transmission towards the target area. For example, as shown in FIG. 13, the transmitted waves captured by the phase shift element 710 and are further focused towards particular objects such as 752, 754 of a target area 750. Such transmitting and reflecting waves are oriented radially away from the board 702 and perpendicular thereto. In exemplary cases, the phase shift element 710 may be employed in a number of applications such as including but are not limited to active electronically scanned array (AESA), passive electronically scanned array (PESA). Few exemplary phase shifters include variable phase shifters equipped with varactor diodes, PIN diode phase shifters (which have three types: switched line, loaded line, and reflection), a Nolen matrix based constant phase shifter, Butler matrix based phase shifter for constant phase shifts, complementary split ring resonators (CSRRs), a tunable band-pass filter as phase shifter, a liquid crystal miniaturized phase shifter, vector-sum phase shifters by using CMOS technology, and so on. The phase shifters listed above are exemplary in nature and should not limit the scope of the invention. Any other suitable phase shifter can be used according to the application purpose.

In some embodiments, the board 702 has own processor in the form of a control chip 712 mounted thereon, forming a multi-module system. The control chip 712 is configured to control all the elements of the PCB including the antennas 706 and 708, wave deflection mechanism 704 and the phase shift element 710. The multi-module configuration of the system 700 improves performance and reduces cost. Exemplary Multi-chip module technologies which can be used includes, but not limited to, the IBM Bubble memory MCMs, Intel Pentium Pro, Pentium D Presler, Xeon Dempsey and Clovertown, Sony memory sticks and similar devices.

Figure 12A:
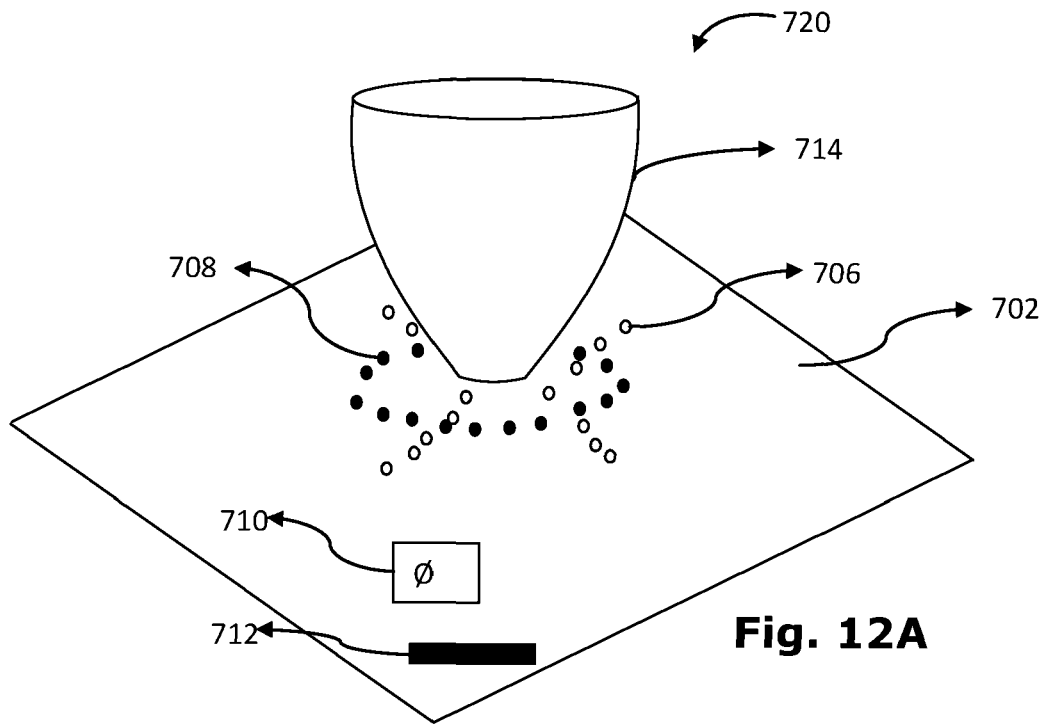
FIG. 12A illustrates a schematic view of a diverging mirror in the PCB mounted radar system in accordance with another embodiment of the present invention.

In some embodiments, the wave deflection mechanism 704 is a diverging mirror 714 as shown in system 720 of the FIG. 12A. The geometry of the diverging reflector 714 may be selected to adjust elevation by varying the radius of the mirror 714 according to height. The field of view may be optimized for azimuth elevation mirror-transmitter combinations.

Figure 12B:
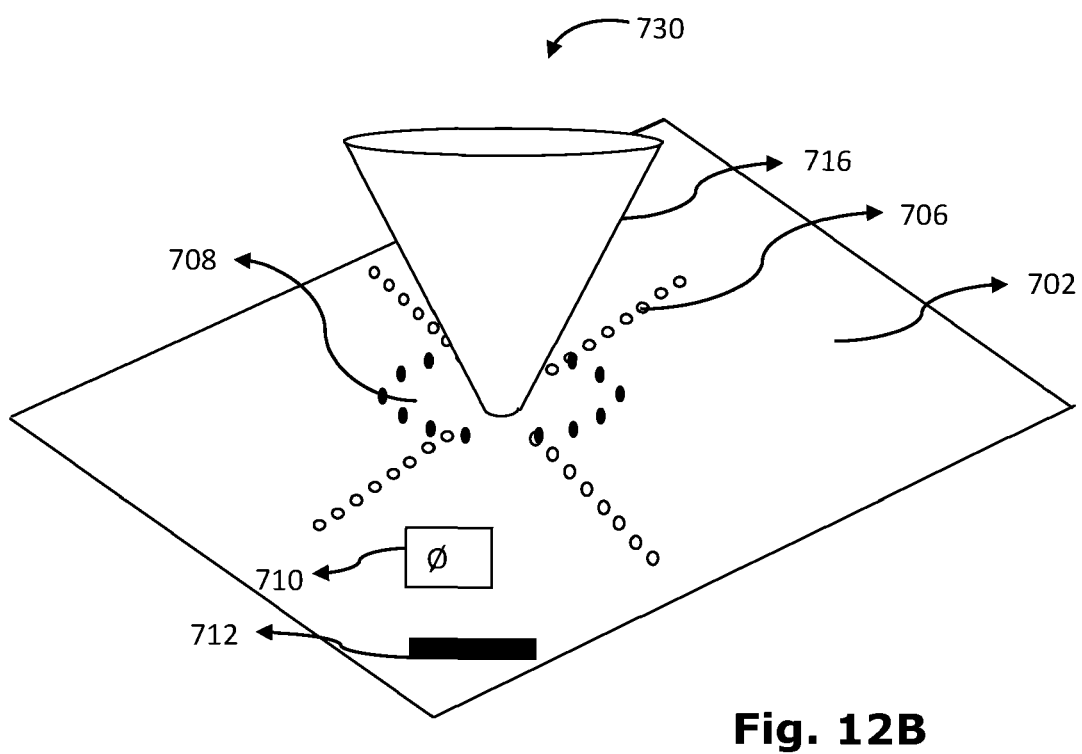
FIG. 12B illustrates a schematic view of a conical mirror in the PCB mounted radar system in accordance with another embodiment of the present invention.

In some embodiments, the wave deflection mechanism 704 is a conical mirror 716 as shown in system 730 of the FIG. 12B. The conical mirror 716 may be configured to reflect a beam parallel to the surface of the board 702. The geometry of the reflector 704 may be selected to adjust elevation by varying the radius of the cone of the conical mirror 716.

Figure 12C:
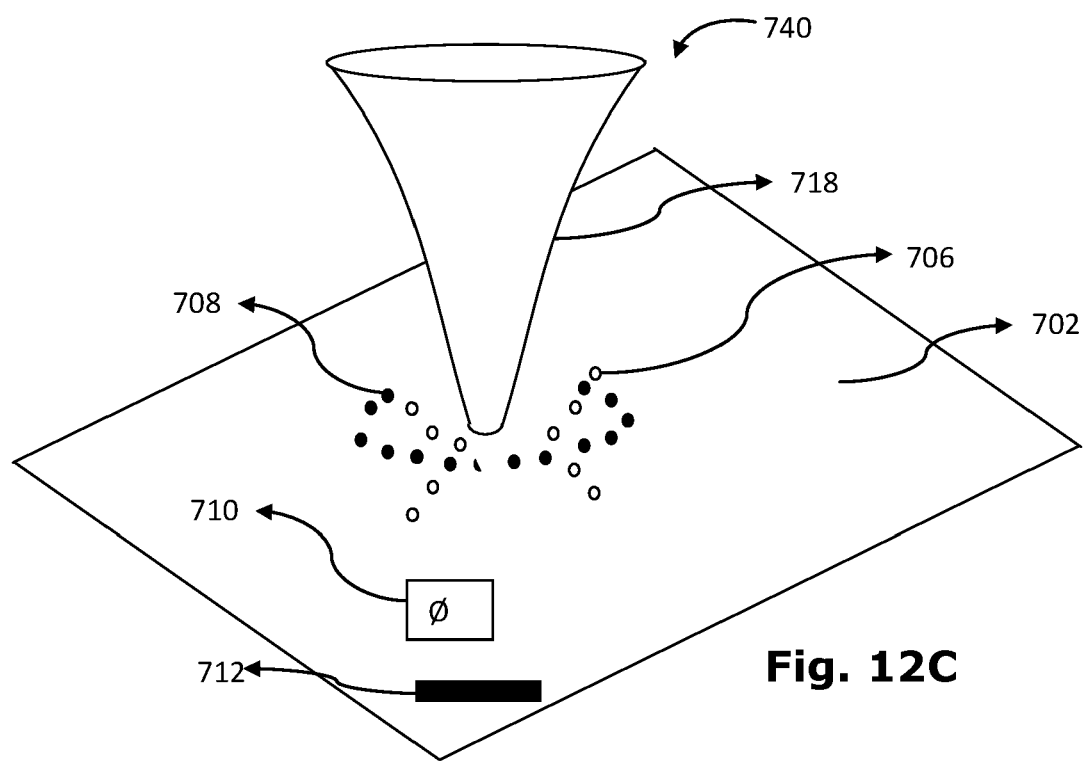
FIG. 12C illustrates a schematic view of a parabolic mirror in the PCB mounted radar system in accordance with an embodiment of the present invention.
Figure 12D:
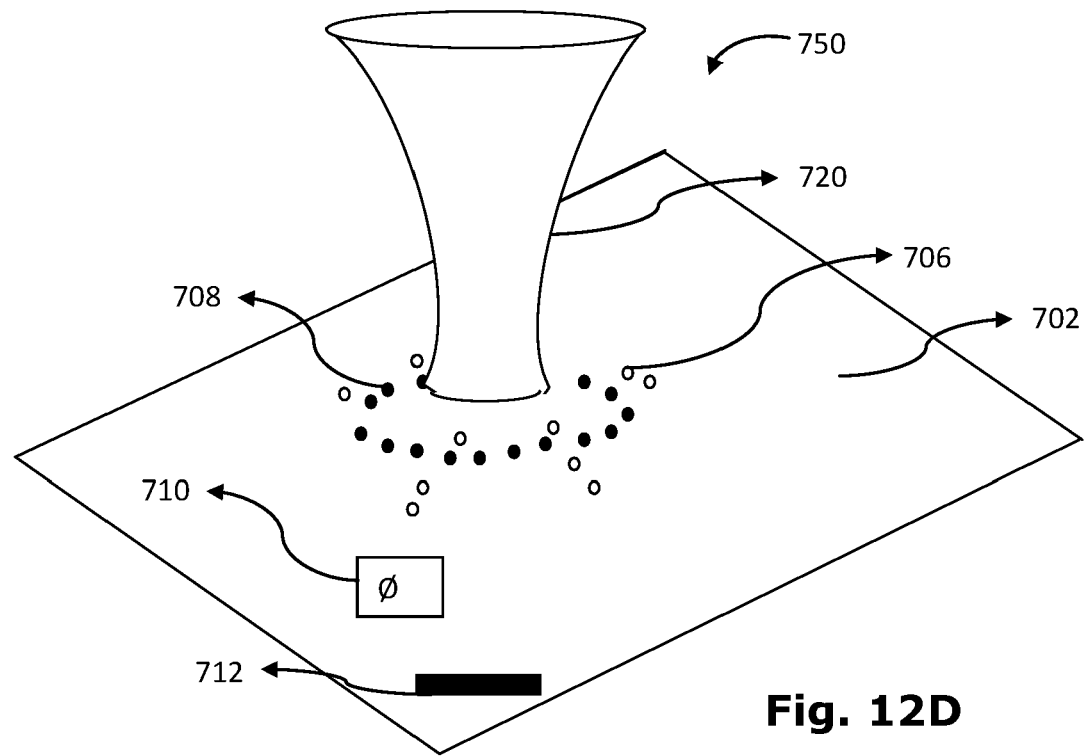
FIG. 12D illustrates a schematic view of a hyperbolic mirror in the PCB mounted radar system in accordance with another embodiment of the present invention.

FIG. 12C illustrates a schematic view of the system 740 having wave deflection mechanism 704 as the parabolic mirror 718. The wave deflection mechanism 704 is a hyperbolic mirror 720 as shown in system 750 of the FIG. 12D. In some embodiments, the wave deflection mechanism 704 can be hyperbolic paraboloid, ellipoid, elliptic paraboloid, and so on. Further, the arrangements of the antennas 706, and 708 on the board 702 may be anamorphosic such that the image of the array thereof is orthogonal or any other required geometry.

It should be clearly understood that the geometry of the wave deflection mechanism 704 and the arrangement of antennas 706 and 708 disclosed above are exemplary in nature and should not limit the scope of the invention.

In some embodiments, the wave deflection mechanism or beam-deflecting device is a quasioptic refractive system composed of one or more dielectric lenses. The quasioptic refractive system may include dielectric lenses having curved surfaces to deflect the beams or change their shape. By a matter of example, the system may act as a fish-eye lens to widen the field of view of the MIMO-radar system to 180 degrees and beyond. As another example, the beam-deflecting device may act as a telescope, to narrow the field of view and concentrate the energy to this region—an exemplary application is a long range automotive radar. In yet another embodiment the dielectric lenses may be formed as holographic lenses, e/g/ as a Fresnel lens. In yet another embodiment the one or more lens may be a graded-index lens having regions with materials of different dielectric constant. The different dielectric constant may be implemented by having regions of same material with differing porosity levels. Different dielectric constant may be implemented by having regions with metallic inclusions of differing density. Flat-shaped lenses may be implemented using transmit-array technology. Some of the refracting elements may incorporate pseudorandom regions to form speckle-like beams. In embodiments, the lenses may include anti-reflecting matching layers. In an example, the lens includes multiple strata of materials. Each of the materials has characteristic dielectric properties in order to curve the path of the waves through the body thereof. In an embodiment, at least one lens may be incorporated into a radome that protects the antenna array from the elements. In an embodiment, the radome includes a structure to which the antenna array is attached. In an embodiment, the structure is optically transparent. In an embodiment, the structure is a sheet of glass. In an embodiment, the structure is a multilayer sheet of glass. In an embodiment, the sheet of glass is vehicle's window, while in another it is vehicle's roof. In an embodiment, the radar observes from the inside the outside of the vehicle, while in another the radar observes from the outside the interior of the vehicle. In an embodiment, the structure is building's window, with the radar observing the inside from the outside, or vice versa. In an embodiment, the sheet of glass is a mirror. In an embodiment, it is a rear-view mirror.

In the example that the antenna is implemented on a PCB and more than one subarray occupies different facets of the PCB (e.g. front and back, or front and edge) each subarray or some of the subarrays may be augmented with beam-deflecting devices.

Figure 14:
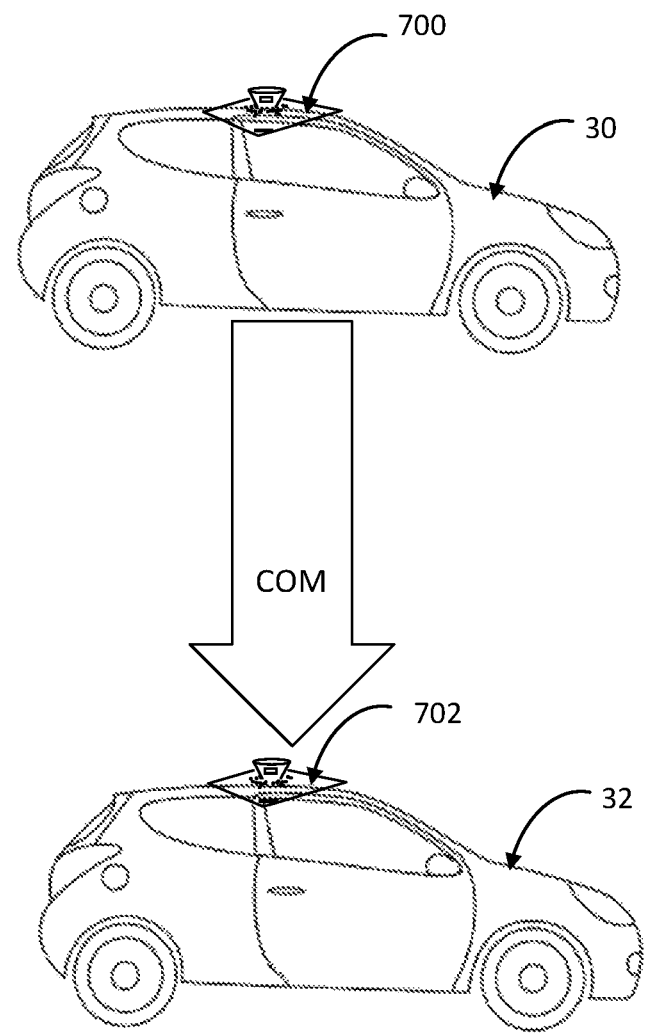
FIG. 14 illustrates an application of the PCB mounted radar system in vehicle to vehicle communication.

By way of example, one application of the radar system of the present invention is shown in FIG. 14. FIG. 14 illustrates a vehicle-to-vehicle (V2V) communication system involving communication between two vehicles. The communication can be in the form of information such as location, speed, any chance of risk, and so on. To ensure a good communication, all the waves carrying the messages must be able to reach from one car 30 to another car 32 and vice versa. The car 30 includes the system 700 which now uses the antenna array and reflector to transmit and receive communication signals. This configuration enables good transmission and reception capability. The car 32 can also include the a second system 702 for better communication with the car 30.

For any persons skilled in the art, it is exemplified that the exemplary embodiments of cars 30, 32 are illustrated to explain the system 700 to make the persons skilled in the art understand the present invention. However, the system 700 is compatible to be installed in any kind of environment such as imaging, target calibration, and so on requiring super-hemispherical radar coverage.

Hence, the system 700 provides a more focused beam of the waves to target different objects in the target area, producing maximum gain in signal during communication.

One possible solution for providing spherical coverage, may be to provide antennas on both sides of the PCB so that one subarray transmits and receives from one hemisphere, while another subarray transmits and receives from the second hemisphere.

In the simplest arrangement, the two subarrays are connected to separate sets of transmitters and receivers, providing independent coverage of both sides of the PCB. One aim of the present invention is to demonstrate arrangements, which reduce the number of transmitters and receivers to achieve spherical coverage.

A feature of the present invention is an antenna element that can radiate to both sides of the PCB. Such antenna elements can be two PCB antennas (e.g. patch antennas, printed cavity antennas) radiating to the two sides of the PCB. The two PCB antennas may be connected to a power splitter, which can serve as a combiner. The lines from the antennas to the splitter may have different lengths, accordingly there may be a phase difference between the signals radiated or received on both sides of the PCB. Additionally or alternatively, a phase difference may be induced by the splitter itself. For example, if the feed line is attached to the two antennas through a 90-degree hybrid coupler (e.g. a branchline coupler), then using one port of the coupler produces 0-90 degree split, while using another port produces 90-0 degree split. In another embodiment, the antenna element itself radiates to both sides. For example the antenna comprises a cavity or a substrate integrated waveguide (SIW) within the PCB, then the cavity or the SIW may comprise radiating slots on both sides of the PCB. Typically, in double-sided antennas the radiating elements on the two sides are either collocated or are in a close proximity to each other.

In one embodiment of a radar or a MIMO radar the transmit antennas of the array are double-sided antennas, while two separate receive subarrays on the two sides of the PCB are used. By this arrangement the targets on both sides of the PCB are illuminated simultaneously, while the analysis of the signals from the two subarrays allows the discrimination, which target is on which side. This arrangement saves on the number of transmitters, but still requires receivers for the antennas of both receive subarrays.

In a second embodiment, both transmit antenna subarray and receive antenna subarray comprise double-sided antennas, to further conserve on the number of both transmitters and receivers. A crucial issue arising in such arrangement is discriminating between targets located on one side or the other side of the PCB. If all the transmit and receive antennas use an in-phase (or same-phase) split, then target on one side of the PCB, or a target at a mirrored location on the other side of the PCB shall produce same set of signals, and therefore will be indistinguishable. Another aspect of present invention, therefore, is a method to distinguish between targets on both sides of a PCB. The method comprises use of double-sided antenna elements that are fed in-phase or in anti-phase according to a pseudorandom pattern. Therefore when setting phases to the transmit/receive elements that result in focusing on a target on one side of the array, a pseudorandom speckle pattern is formed on the other side for the array (and vice versa). Therefore, an exemplary detection procedure in a double-sided MIMO radar would be: (1) transmit from elements of the array and record signals from the receive elements of the array, forming a 2D signal matrix; (2) apply first set of phases to the elements of the 2D matrix and perform beamforming algorithms to detect targets on first side of the PCB; (3) apply second set of phases to the elements of the 2D matrix and perform beamforming algorithms to detect targets on second side of the PCB.

Similar principle is applicable to receive-only (such as direction-finding) arrays. By pseudorandom phase-coding of the double-sided antenna elements, it is possible to discriminate between a signal impinging onto the array on one side vs. signal impinging on the other side.

The system 800 provides high resolution of the electromagnetic signals transmitted and received with a communication device located on the same side as the mounted antennas 108 and 810, i.e. obverse surface of the PCB 806. However, the system 800 provides low resolution of the electromagnetic signals transmitted and received with another communication device located on the opposite side as the mounted antennas 808 and 810, i.e. reverse surface of the PCB 806.

Figure 16:
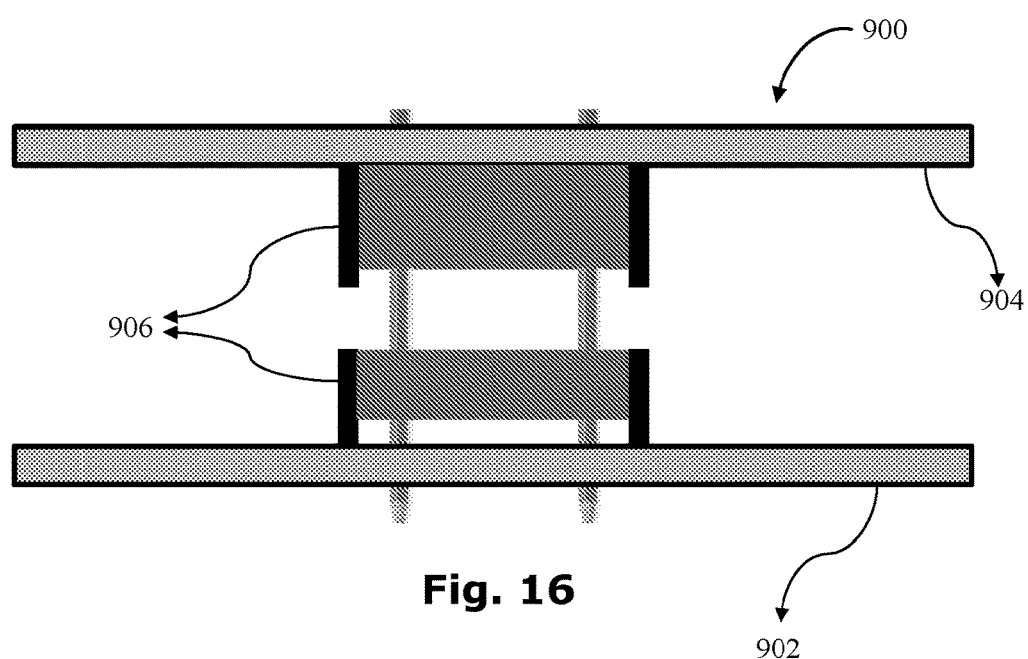
FIG. 16 illustrates a system with two PCB boards connected by-to-back for providing 360 degree coverage.

FIG. 16 illustrates a system 900 with two PCB boards 902 and 904 connected back-to-back through a connector 906. The boards 902 and 904 have antennas mounted on a single surface (outer surfaces) and also have their own controller chips mounted for controlling the antennas. The system 900 is configured to provide 360 degree coverage with high resolution of the electromagnetic signals on both sides of the system 900. However, the use of multiple PCB boards and controller chips increases the cost of the product. Further, the two boards 902 and 904 need to be compatibly configured for proper functioning of the system.

In one aspect of the invention, a Printed Circuit Board (PCB) mounted radar system is disclosed. The radar system provides 360 degree view with high resolution at all the angles in a cost effective manner.

In another aspect of the invention, a Printed Circuit Board (PCB) mounted radar system is disclosed having antennas mounted on both obverse surface and the reverse surface. The system includes arrays of transmitting and receiving antennas mounted on an obverse surface of the PCB board, wherein the transmitting and receiving antennas are configured to communicate with communication devices which are located on the same side as the obverse surface for transmitting and receiving electromagnetic signals. The system also includes arrays of transmitting and receiving antennas mounted on a reverse surface of the PCB board, wherein the transmitting and receiving antennas are configured to communicate with communication devices which are located on the same side as the reverse surface for transmitting and receiving electromagnetic signals. The system further includes an array of receiving antennas mounted at the edge of the PCB, wherein the edge antennas are configured to receive electromagnetic signals reflected towards the PCB from objects within the target region to the side of the PCB. The system also includes a control chip configured to control all the elements of the PCB including the transmitting and receiving antennas.

Figure 15:
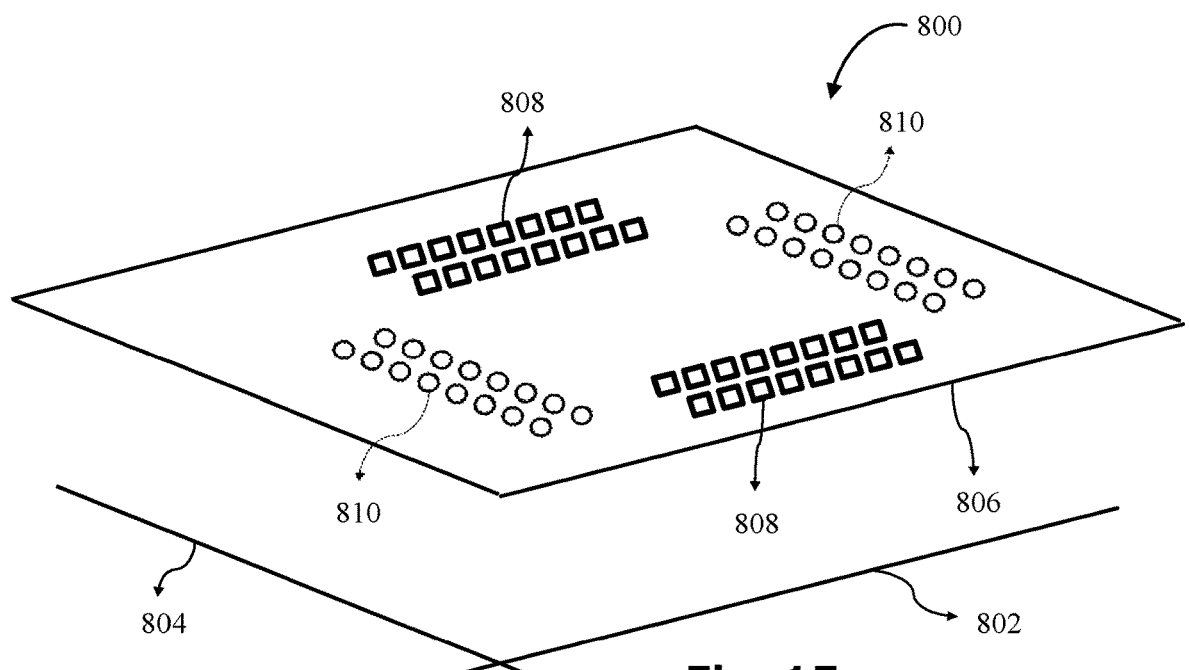
FIG. 15 illustrates a schematic view of a prior art PCB mounted radar system.

Referring back to FIG. 15, a radar system 800 with antennas mounted on a single side of a Printed Circuit Board (PCB) 806. Multiple arrays of transmitting antennas 808 and arrays of receiving antennas 810 are mounted on the PCB 806 along two orthogonal axis 802 and axis 804, respectively. The antennas 808 and 810 are mounted on a single side (e.g. obverse surface) of the PCB 806. The other side (reverse surface) of the PCB 806 (not shown) does not have any antenna mounted, thereon. The antennas 808 and 810 may be configured to transmit and receive electromagnetic signals with other communication devices. For example, vehicles such as cars moving on the road need communicating with each other such as V2V communication systems involving self-driven cars exchanging information such as speed, location, direction of travel, braking, loss of stability, and so on.

Modern radar and communications systems use phased-array antennas to direct the beam to a desired direction. As a particular embodiment, MIMO radars use separate sets of antennas for transmitting and for receiving, so that the beam shape is determined by a combination of the transmit beam and a receive beam. The antennas of the array are attached to multiple transmitters and/or receivers, each having the capability to adjust the phase of the signal to focus it in a desired direction. The phase adjustment can be performed by analog or digital means.

An antenna array implemented on a single side of a PCB is capable of providing a hemispherical coverage, as the PCB effectively shields the other hemisphere. Nevertheless is desirable to have a cost effective radar system providing all round spherical coverage of the transmitting and receiving signals. The PCB mounted radar system of the present invention described herein comes to address this need.

Figure 17A:
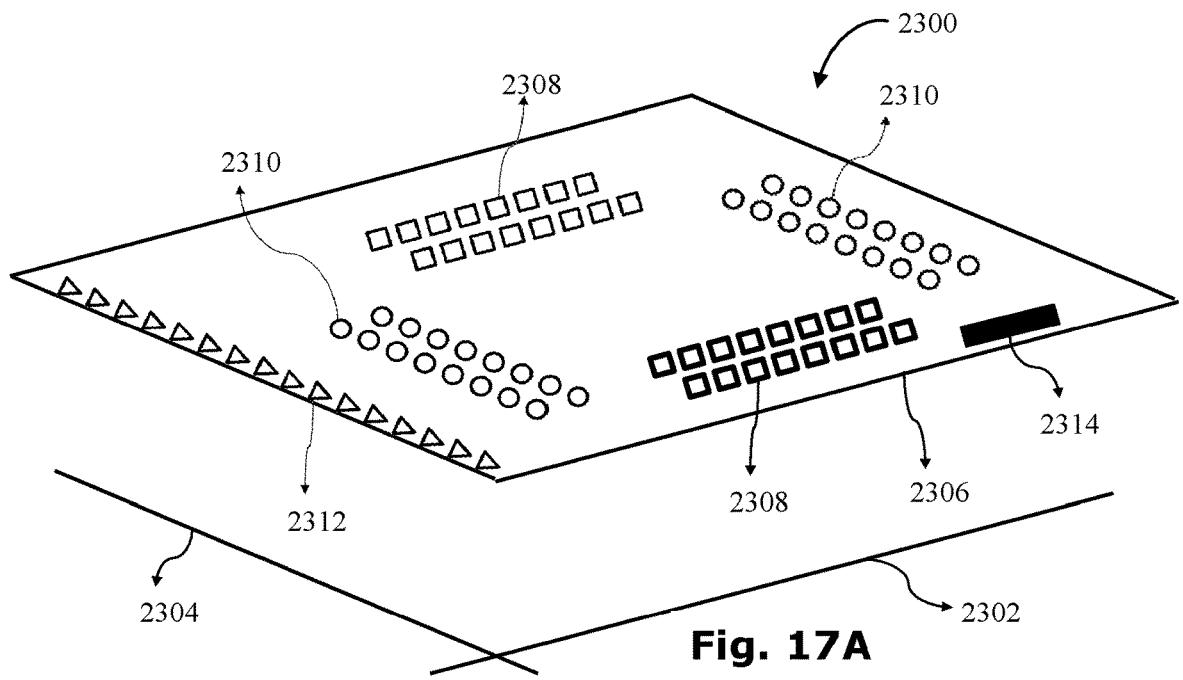
FIG. 17A illustrates a schematic view of an obverse surface of a PCB mounted radar system, in accordance with an embodiment of the present invention.
Figure 17B:
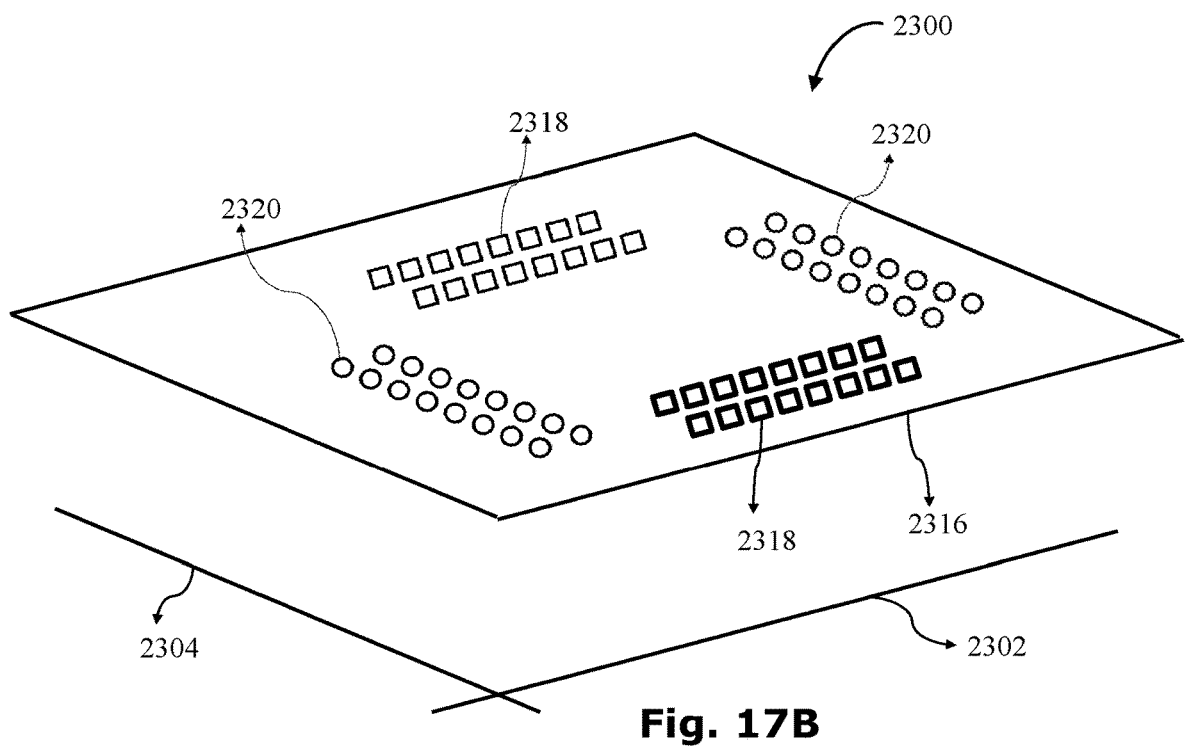
FIG. 17B illustrates a schematic view of a reverse surface of the PCB mounted radar system.

FIGS. 17A and 17B illustrate schematic views of a PCB mounted radar system 2300, in accordance with an embodiment of the present invention. The radar system 2300 can be a part of a communication device which can communicate with other devices. The communication device or the other devices herein may consist of, be part of, or include, a Personal Computer (PC), a desktop computer, a mobile computer, a laptop computer, a notebook computer, a tablet computer, a server computer, a handheld computer, a handheld device, a Personal Digital Assistant (PDA) device, or a cellular handset. Alternatively or in addition, the communication device or the other devices may consist of, be part of, or include, a handheld PDA device, an on-board device, an off-board device, a hybrid device, a vehicular device, a non-vehicular device, a mobile device, or a portable device. Further, the communication device or the other devices may comprise of networking equipment such as routers, switches, bridges, gateways, etc.

FIG. 17A illustrates an obverse surface 2306 of the PCB mounted radar system 2300. The obverse surface 2306 has arrays of transmitting antennas 2308 mounted along an axis 2302. The surface 2306 also has arrays of receiving antennas 2310 mounted along an axis 2304. The array of antennas 2308 and 2310 are configured to communicate with communication devices which are located on the same side as the obverse surface 2306 for transmitting and receiving electromagnetic signals. In a preferred embodiment of the present invention, the axis 2302 is orthogonal to the axis 2304. The mounted of antennas along orthogonal axes allows better coverage of the signals transmitted and received with other communication devices. Further, the axis 2302 can be at any other angle with respect to axis 304 depending upon the shape and geometry of the PCB 2300.

The surface 2306 also has an array of receiving antennas 2312 mounted at the edge of the PCB 2300. The antennas 2312 are configured to receive electromagnetic signals reflected towards the PCB 2300 from objects within the target region to the side of the PCB 2300.

In some embodiments, the PCB 2300 has its own processor in the form of a control chip 2314 mounted on the obverse surface 2306, forming a multi-module system. The control chip 2314 is configured to control all the elements of the PCB 300 including the transmitting antennas 308 and receiving antennas 2310 and 2312. The multi-module configuration of the system 300 improves performance and reduces cost. Exemplary Multi-chip module technologies which can be used includes, but not limited to, the IBM Bubble memory MCMs, Intel Pentium Pro, Pentium D Presler, Xeon Dempsey and Clovertown, Sony memory sticks and similar devices.

FIG. 17B illustrates a schematic view of a reverse surface 2316 of the PCB mounted radar system 2300. The reverse surface 2316 has arrays of transmitting antennas 2318 mounted along the axis 2302. The surface 2316 also has arrays of receiving antennas 2320 mounted along the axis 2304. The array of antennas 2318 and 2320 are configured to communicate with communication devices which are located on the same side as the reverse surface 2316 for transmitting and receiving electromagnetic signals. The antennas 2318 and 2320 are also controlled by the control chip 2314 mounted on the obverse surface 2306.

In some embodiments, the system 2300 is advantageous from the prior systems as being a cost effective system and provides 360 degree coverage of the electromagnetic signals through the antennas mounted on both obverse surface 2306 and reverse surface 2316. Since all the elements mounted on both surfaces 2306 and 2316 are controlled by a single control chip 2314, the cost effectiveness of the system 2300 is further enhanced. Moreover, system 2300 also does not suffer from the compatibility issues as happens in using systems having back-to-back mounted PCBs.

Figure 18A:
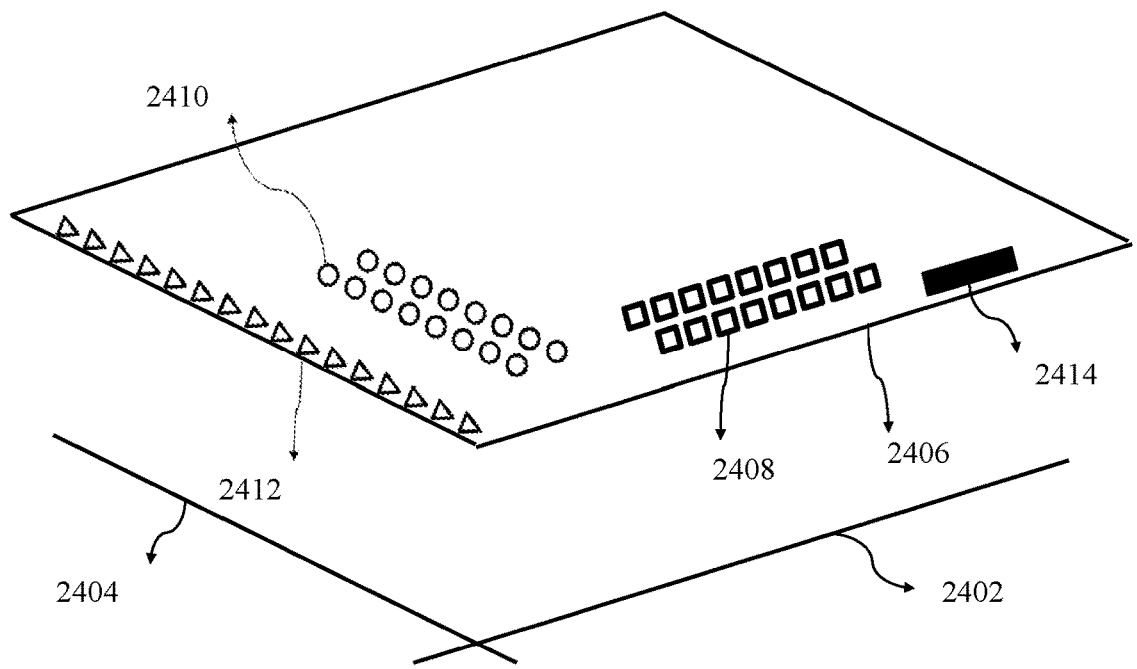
FIG. 18A illustrates a schematic view of an obverse surface of a PCB mounted radar system, in accordance with another embodiment of the present invention.
Figure 18B:
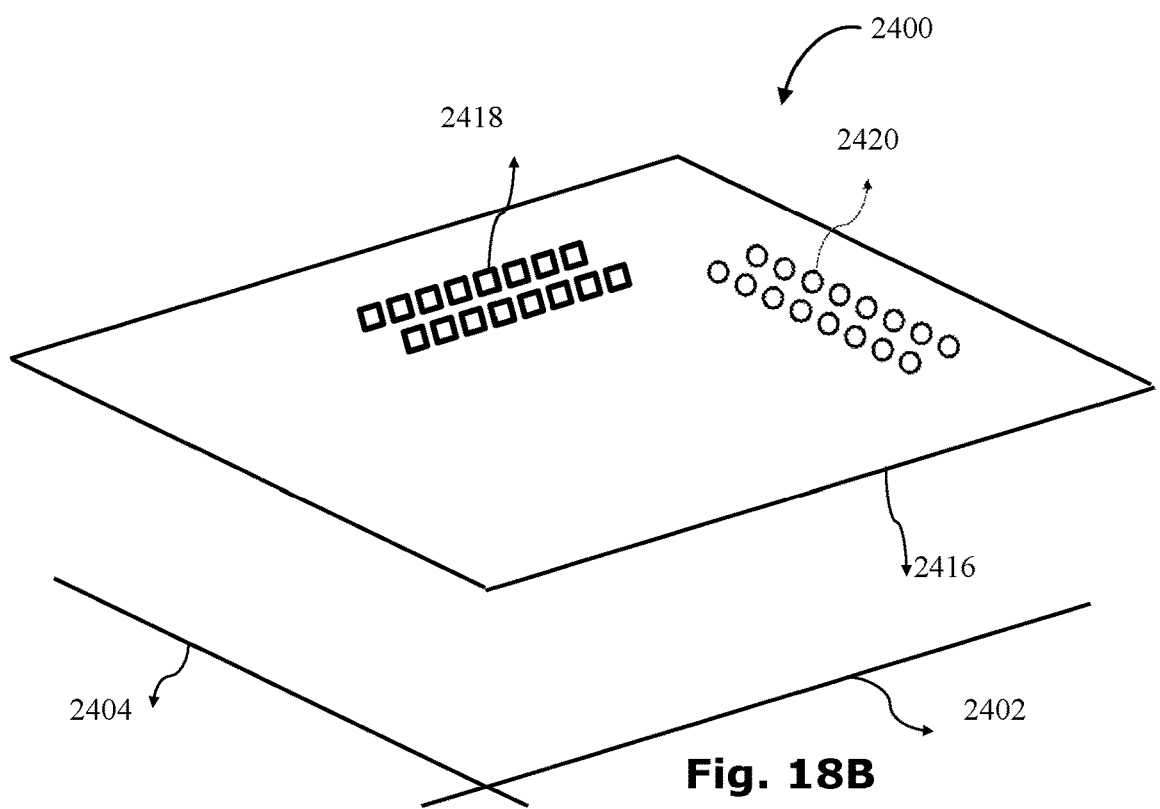
FIG. 18B illustrates a schematic view of a reverse surface of the PCB mounted radar system.

FIGS. 18A and 18B illustrate schematic views of a PCB mounted radar system 2400, in accordance with another embodiment of the present invention. FIG. 18A illustrates an obverse surface 2406 of the PCB mounted radar system 2400. The obverse surface 2406 has an array of transmitting antennas 2408 mounted along the axis 2402. The surface 2406 also has an array of receiving antennas 2410 mounted along the axis 2404. The array of antennas 2408 and 2410 are configured to communicate with communication devices which are located on the same side as the obverse surface 2406 for transmitting and receiving electromagnetic signals. The surface 2406 also has an array of receiving antennas 2412 mounted at the edge of the PCB 2400. The antennas 2412 are configured to receive electromagnetic signals reflected towards the PCB 2400 from objects within the target region to the side of the PCB 2400.

FIG. 18B illustrates a schematic view of a reverse surface 2416 of the PCB mounted radar system 2400. The reverse surface 2416 has arrays of transmitting antennas 418 mounted along the axis 2402. The surface 2416 also has arrays of receiving antennas 2420 mounted along the axis 2404. The array of antennas 2418 and 2420 are configured to communicate with communication devices which are located on the same side as the reverse surface 2416 for transmitting and receiving electromagnetic signals. In a particular embodiment, the transmitting antennas 2408 are located in parallel to the antennas 2418. Similarly, the receiving antennas 410 are located in parallel to the antennas 2420.

Figure 19A:
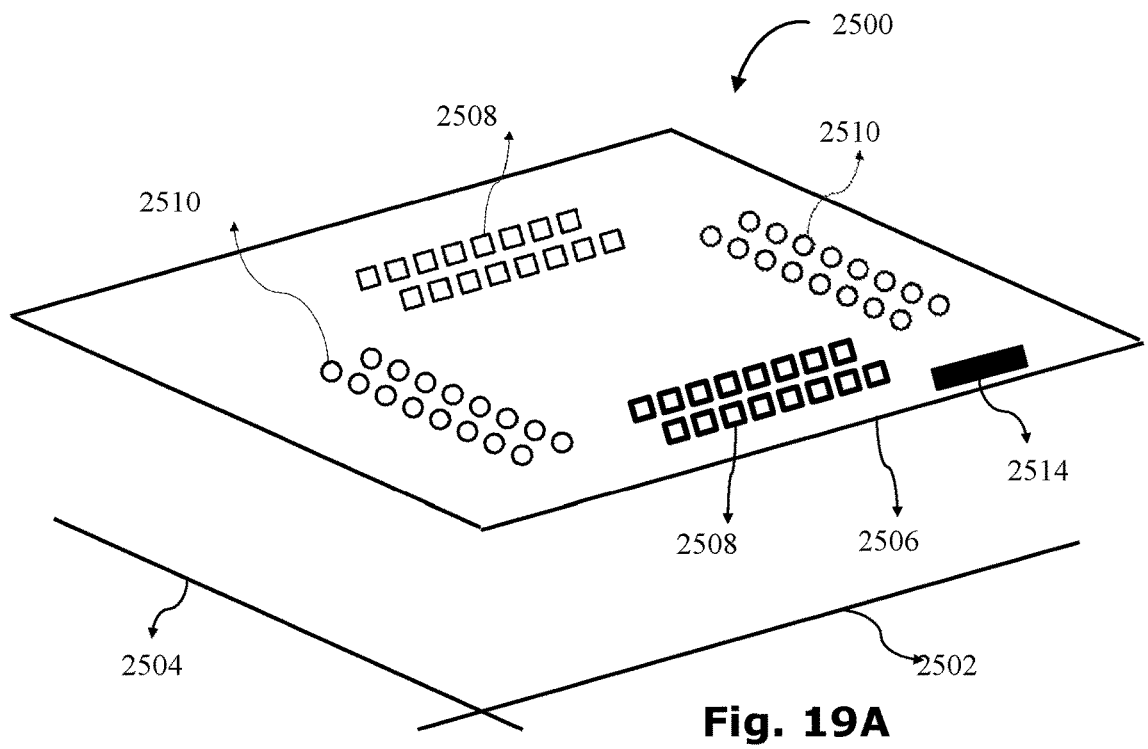
FIG. 19A illustrates a schematic view of an obverse surface of a PCB mounted radar system, in accordance with yet another embodiment of the present invention.
Figure 19B:
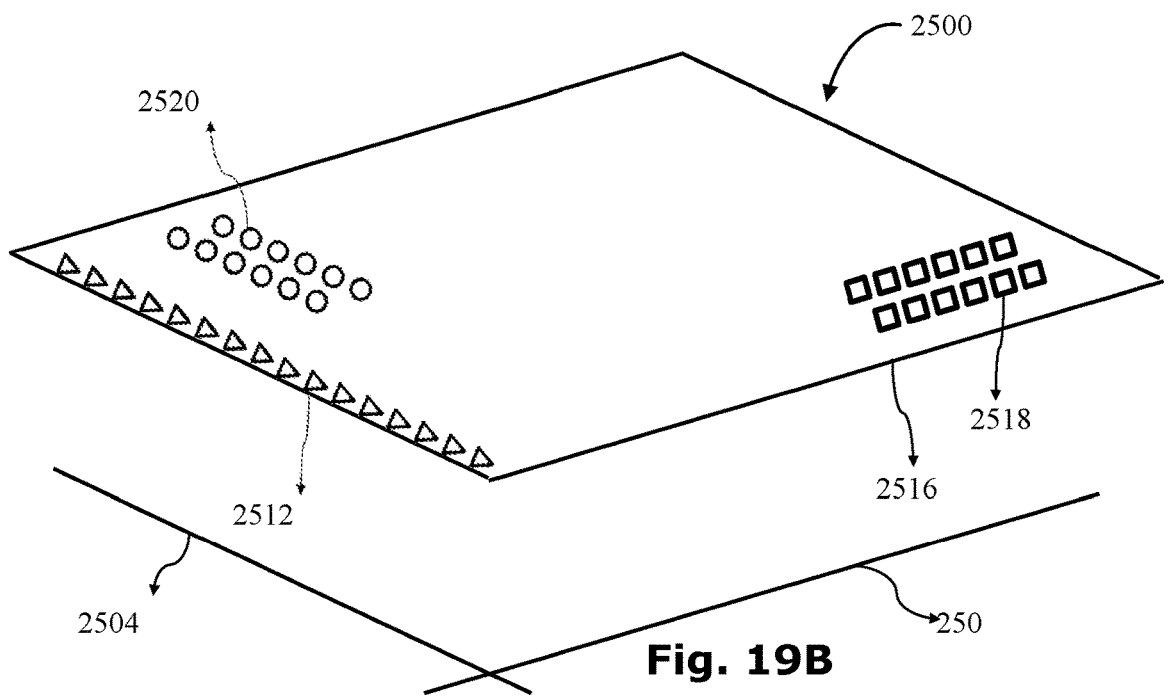
FIG. 19B illustrates a schematic view of a reverse surface of the PCB mounted radar system.

FIGS. 19A and 19B illustrate schematic views of a PCB mounted radar system 2500, in accordance with yet another embodiment of the present invention. The transmitting antennas 2508 on the obverse surface 2506 and the transmitting antennas 2518 on the reverse surface 2516 are mounted along the same line on the opposite surfaces 2506 and 2516. Similarly, the receiving antennas 2510 on the obverse surface 2506 and the receiving antennas 2520 on the reverse surface 2516 are mounted along the same line on the opposite surfaces 2506 and 2516. Further, the receiving antennas 2512 are mounted at the edge of the reverse surface 2516 of the PCB 2500.

In some embodiments, the array of transmitting and/or receiving antennas may be mounted in circular or semi-circular configuration over any surface of the PCB. Further, the array of transmitting and/or receiving antennas may be mounted in a polygon configuration, including, but not limited to, a triangle, a rectangle, a pentagon, a hexagon, a heptagon, an octagon, a nonagon, a decagon, and so on, over any surface of the PCB. Also, the array of transmitting and/or receiving antennas may be mounted in a canonical, a parabolic, a hyperbolic, an ellipsoid or an elliptic configuration over any surface of the PCB.

It should be clearly understood to a person skilled in the art that the configuration and position of transmitting and receiving antennas and the control chip mounted on the obverse surface and the reverse surface of the PCB discussed above is exemplary in nature and should not limit the scope of the invention.

Figure 20:
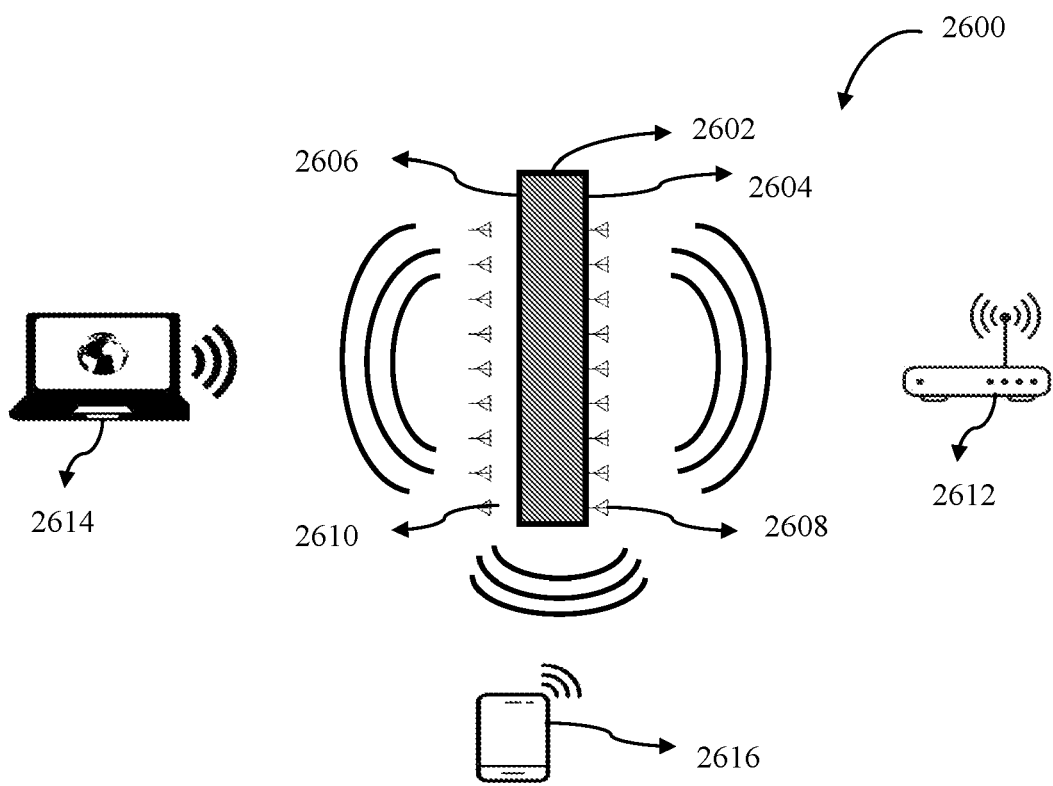
FIG. 20 illustrates a system with communication between the PCB mounted radar system and multiple communication devices.

It is further noted that although the double sided antenna arrays are described herein in the context of radar applications, the double sided configuration may be used in other applications such as communication. By way of example, FIG. 20 illustrates a system 2600 with communication between the PCB mounted antenna array system 2602 and multiple communication devices 2612, 2614 and 2616. The antennas mounted on the obverse surface 2604 of the PCB 2602 transmit and receive electromagnetic signals with a routing device 2612. The antennas mounted on the reverse surface 2606 of the PCB 2602 transmit and receive electromagnetic signals with a laptop device 2614. The antennas mounted at the edge of the PCB 2602 transmit and receive electromagnetic signals with a mobile device 2616. The antenna array system 2602 provides 360 degree view with high resolution at all the angles. The communication devices 2612, 2614 and 2616 illustrated are exemplary in nature and should not limit the scope of the invention. The communication devices 2612, 2614 and 2616 herein may consist of, be part of, or include, a Personal Computer (PC), a desktop computer, a mobile computer, a laptop computer, a notebook computer, a tablet computer, a server computer, a handheld computer, a handheld device, a Personal Digital Assistant (PDA) device, or a cellular handset. Alternatively or in addition, the communication devices 2612, 2614 and 2616 may consist of, be part of, or include, a handheld PDA device, an on-board device, an off-board device, a hybrid device, a vehicular device, a non-vehicular device, a mobile device, or a portable device. Further, the communication devices 2612, 2614 and 2616 may comprise of networking equipment such as routers, switches, bridges, gateways, etc.

An exemplary application of the radar system of the present invention can be a vehicle-to-vehicle (V2V) communication system involving communication between two vehicles. The communication can be in the form of information such as location, speed, any chance of risk, and so on.

Technical Notes

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 7 to 4, from 7 to 6, from 3 to 6 etc., as well as individual numbers within that range, for example, 1, 7, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A system for providing wide field-of-view radar comprising:
- an antenna array comprising an array of transmitting antennas mounted to a printed circuit board and an array of receiving antennas mounted to the printed circuit board;
- a wave deflection mechanism mounted in proximity to the printed circuit board configured such that
  - waves transmitted away from the printed circuit board by the array of transmitting antennas are incident upon the wave deflection mechanism and are directed away from the printed circuit board with a different direction and field of view, and
  - waves reflected from objects within a target region towards the wave deflection mechanism are directed towards the receiving antennas onto the printed circuit board;
- at least one binary phase shifter configured and operable to selectively apply a phase shift of 180 degrees to a signal to be transmitted;
- a controller configured to send instructions to the at least one binary phase shifter;
- a receiver having at least one receiving antenna; and
- a post processor comprising
  - a memory operable to save received signals, and
  - a processing unit operable to apply a 90 degree phase shift to selected signals stored in the memory, and further operable to sum signals stored in the memory, wherein the controller is operable to
- determine a required complex steering vector for each antenna of the array, the complex steering vector comprising a real component selected from 0 and 180 degrees and an imaginary component selected from 90 and 270 degrees,
- instruct the binary phase shifters to apply a 180 degree phase shift to the transmitted signal to be transmitted during a first interval for each antenna having an associated steering vector with a real component of 180 degrees, and
- instruct the binary phase shifters to apply a 180 degree phase shift to the signal to be transmitted during a second interval for each antenna having an associated steering vector with an imaginary component of 180 degrees, wherein the receiver is operable to receive waves reflected towards it during the first time interval and during the second time interval, and wherein said post processor is operable to
- apply a 90 degree phase shift to signals received during the second time interval, and
- sum the signals received during the first time interval to 90 degree phase shifted signals received during the second time interval.

2. The system of claim 1 comprising a dedicated binary phase shifter for each transmitting antenna of the array.

3. The system of claim 1 further comprising an independently controlled switch connecting each transmission antenna to the oscillator.

* * * * *